United States Patent

Tomizaki et al.

(10) Patent No.: US 9,075,418 B2
(45) Date of Patent: Jul. 7, 2015

(54) VIBRATION DAMPING DEVICE AND METHOD FOR CANCELING OUT A VIBRATION AT A DAMPING POSITION BASED ON A PHASE DIFFERENCE

(75) Inventors: Takeshi Tomizaki, Ise (JP); Hideaki Moriya, Ise (JP); Takeo Ito, Ise (JP); Yasushi Muragishi, Ise (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 149 days.

(21) Appl. No.: 13/473,876

(22) Filed: May 17, 2012

(65) Prior Publication Data

US 2012/0226414 A1 Sep. 6, 2012

Related U.S. Application Data

(63) Continuation of application No. PCT/JP2010/071051, filed on Nov. 25, 2010.

(30) Foreign Application Priority Data

Nov. 25, 2009 (JP) ................... 2009-267245
Nov. 26, 2009 (JP) ................... 2009-269276
Nov. 27, 2009 (JP) ................... 2009-269640

(51) Int. Cl.
*G06F 7/00* (2006.01)
*G05D 19/02* (2006.01)
(Continued)

(52) U.S. Cl.
CPC ............... *G05D 19/02* (2013.01); *F16F 15/005* (2013.01); *G10K 11/178* (2013.01); *F16F 15/002* (2013.01)

(58) Field of Classification Search
CPC ....... F16F 15/00; F16F 15/002; F16F 15/005; G05B 13/02; G05B 13/021; G05D 19/00; G05D 19/02; G10K 11/1788; G10K 11/178

USPC ............. 700/279, 280; 381/71.4, 71.7, 71.12; 701/36; 702/56, 191

See application file for complete search history.

(56) References Cited

U.S. PATENT DOCUMENTS 4,900,226 A * 2/1990 de Vries .......................... 416/34
5,173,631 A * 12/1992 Suganuma ............... 310/316.02
(Continued)

FOREIGN PATENT DOCUMENTS

| JP | 2003-202902 | 7/2003 |
| JP | 2006-336736 | 12/2006 |

(Continued)

*Primary Examiner* — Thomas G Black
*Assistant Examiner* — Sze-Hon Kong
(74) *Attorney, Agent, or Firm* — Oblon, McClelland, Maier & Neustadt, L.L.P.

(57) ABSTRACT

A damping device includes a calculator calculating a pseudo vibration to cancel a source vibration transmitted from a vibration source to a position to be damped, using an adaptive control algorithm. The canceling vibration is generated according to the pseudo vibration. A vibration detector detects an error vibration remaining at the position. The adaptive control algorithm is adapted by learning to reduce the error vibration. A frequency recognizer recognizes a frequency of the source vibration from a signal related to the vibration source. The frequency of the vibration is used to determine a frequency of the pseudo vibration. A phase difference identifier identifies a phase difference between the error vibration and the canceling vibration according to the pseudo vibration, and a frequency corrector corrects, according to the phase difference, the frequency of the vibration to eliminate the phase difference.

6 Claims, 19 Drawing Sheets

(51) Int. Cl.
*F16F 15/00* (2006.01)
*G10K 11/178* (2006.01)

(56) References Cited

U.S. PATENT DOCUMENTS

| | | | |
|---|---|---|---|
| 5,369,348 A * | 11/1994 | Gennesseaux | 318/623 |
| 5,386,372 A * | 1/1995 | Kobayashi et al. | 700/280 |
| 5,392,607 A * | 2/1995 | Wu | 62/6 |
| 5,426,703 A * | 6/1995 | Hamabe et al. | 381/71.12 |
| 5,488,667 A * | 1/1996 | Tamamura et al. | 381/71.4 |
| 5,537,967 A * | 7/1996 | Tashiro et al. | 123/192.1 |
| 5,608,360 A * | 3/1997 | Driscoll | 331/107 A |
| 5,629,986 A * | 5/1997 | Shoureshi | 381/71.12 |
| 5,638,305 A * | 6/1997 | Kobayashi et al. | 700/280 |
| 5,710,720 A * | 1/1998 | Algrain et al. | 700/280 |
| 5,713,438 A * | 2/1998 | Rossetti et al. | 188/378 |
| 5,786,735 A * | 7/1998 | Su | 331/158 |
| 5,823,307 A * | 10/1998 | Schubert et al. | 188/378 |
| 5,912,821 A * | 6/1999 | Kobayashi | 700/280 |
| 5,920,173 A * | 7/1999 | Mercadal et al. | 318/649 |
| 5,983,168 A * | 11/1999 | Michler | 702/194 |
| 6,018,689 A * | 1/2000 | Kumura et al. | 700/280 |
| 6,285,514 B1 * | 9/2001 | O'Meara et al. | 359/721 |
| 6,325,365 B1 * | 12/2001 | Fujita et al. | 267/140.15 |
| 6,734,739 B2 * | 5/2004 | Kawahara | 331/25 |
| 6,819,730 B2 * | 11/2004 | He | 375/376 |
| 6,933,629 B2 * | 8/2005 | Qiu et al. | 310/34 |
| 7,027,897 B2 * | 4/2006 | Shen et al. | 701/1 |
| 7,183,691 B2 * | 2/2007 | Yamamoto | 310/316.01 |
| 7,514,843 B2 * | 4/2009 | Nagahama et al. | 310/317 |
| 7,650,760 B2 * | 1/2010 | Nakata et al. | 62/228.1 |
| 7,773,760 B2 * | 8/2010 | Sakamoto et al. | 381/71.9 |
| 7,873,173 B2 * | 1/2011 | Inoue et al. | 381/71.4 |
| 8,040,191 B2 * | 10/2011 | Hirai | 331/16 |
| 8,044,629 B2 * | 10/2011 | Fallahi | 318/611 |
| 8,064,612 B2 * | 11/2011 | Sakamoto et al. | 381/71.4 |
| 8,098,836 B2 * | 1/2012 | Sakamoto et al. | 381/71.4 |
| 8,098,837 B2 * | 1/2012 | Inoue et al. | 381/71.4 |
| 8,111,835 B2 * | 2/2012 | Inoue et al. | 381/71.4 |
| 8,139,629 B2 * | 3/2012 | Muramatsu et al. | 375/232 |
| 2004/0160280 A1 * | 8/2004 | Kegasa et al. | 331/16 |
| 2004/0247137 A1 * | 12/2004 | Inoue et al. | 381/71.4 |
| 2005/0047711 A1 * | 3/2005 | Ide et al. | 385/18 |
| 2007/0140503 A1 * | 6/2007 | Sakamoto et al. | 381/71.4 |
| 2007/0222407 A1 * | 9/2007 | Sakamoto et al. | 318/611 |
| 2008/0068097 A1 * | 3/2008 | Sung | 331/25 |
| 2008/0192948 A1 * | 8/2008 | Kan et al. | 381/71.4 |
| 2008/0240455 A1 * | 10/2008 | Inoue et al. | 381/71.4 |
| 2008/0289887 A1 * | 11/2008 | Flint et al. | 178/18.03 |
| 2008/0292110 A1 * | 11/2008 | Kobayashi et al. | 381/71.4 |
| 2009/0067638 A1 * | 3/2009 | Sakamoto et al. | 381/71.4 |
| 2009/0175461 A1 * | 7/2009 | Nakamura et al. | 381/71.1 |
| 2009/0179708 A1 * | 7/2009 | Tamura | 331/34 |
| 2009/0279710 A1 * | 11/2009 | Onishi et al. | 381/71.4 |
| 2010/0014685 A1 * | 1/2010 | Wurm | 381/71.11 |
| 2010/0097151 A1 * | 4/2010 | Arai | 331/25 |
| 2010/0284546 A1 * | 11/2010 | DeBrunner et al. | 381/71.2 |
| 2012/0277917 A1 * | 11/2012 | Ryaboy et al. | 700/280 |

FOREIGN PATENT DOCUMENTS

| | | |
|---|---|---|
| JP | 2008-250131 | 10/2008 |
| JP | 2009-275822 | 11/2009 |

* cited by examiner

FIG.12
(a)
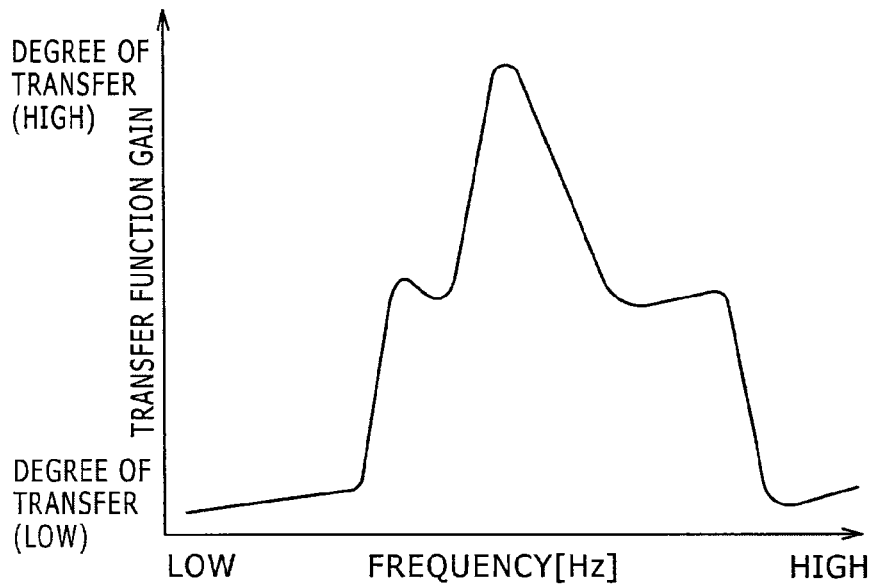
(b)
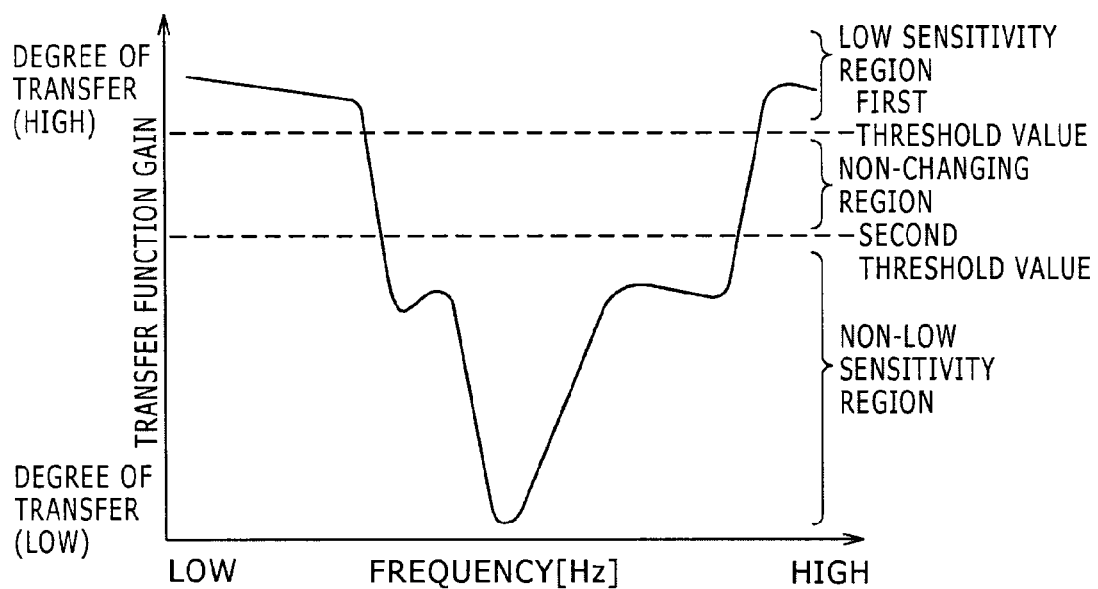

FIG.13
(a)
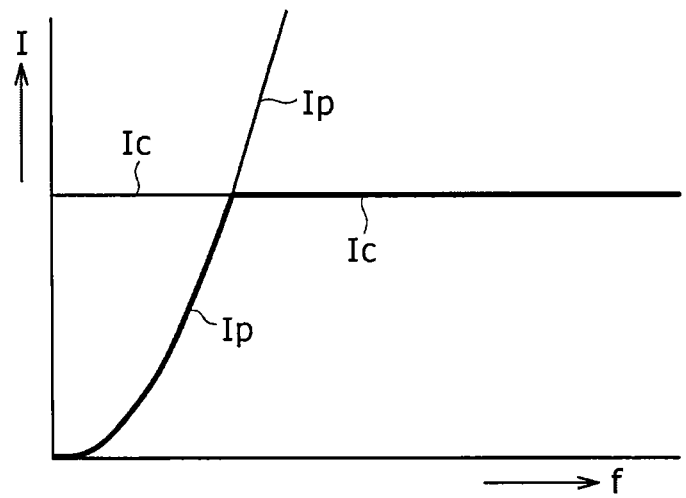
(b)
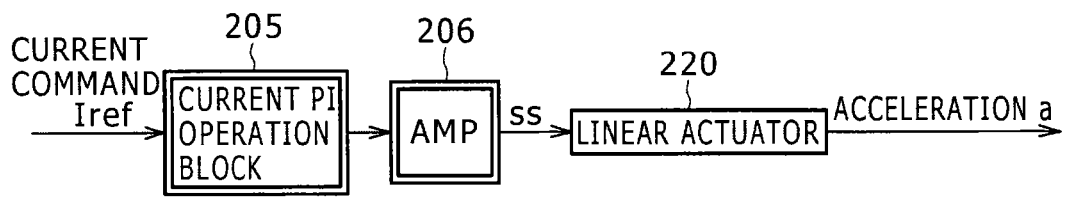
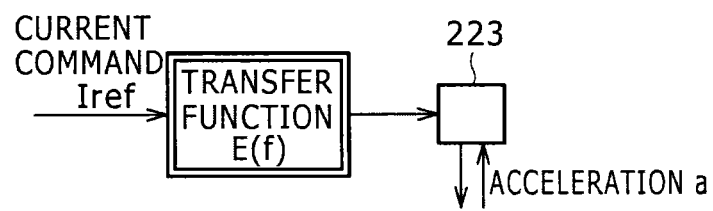

VIBRATION DAMPING DEVICE AND METHOD FOR CANCELING OUT A VIBRATION AT A DAMPING POSITION BASED ON A PHASE DIFFERENCE

CROSS-REFERENCE TO RELATED APPLICATION

This application is a continuation application of International Application No. PCT/JP2010/071051, filed Nov. 25, 2010, the entire content of which is incorporated herein by reference. PCT/JP2010/071051 claims priority to JP 2009-267245, filed Nov. 25, 2009, JP 2009-269276, filed Nov. 26, 2009, and JP 2009-269640, filed Nov. 27, 2009, the entire contents of which are also incorporated herein by reference.

TECHNICAL FIELD

The present disclosure relates to a vibration damping device for suppressing a generated vibration, and particularly to a vibration damping device whose vibration damping control is improved in stability and a vehicle provided with the same.

BACKGROUND ART

A vibration damping device for canceling out a vibration caused by a vibration generating source such as an engine of a vehicle or the like and a canceling vibration generated through vibration applying means at a position to be damped is conventionally known. Patent Document 1 discloses, as such a conventional vibration damping device, a vibration damping device that calculates a pseudo vibration corresponding to a vibration to be damped using an adaptive control algorithm, generates a canceling signal on the basis of the calculated pseudo vibration, makes a canceling vibration generated at a position to be damped through vibration applying means such as an actuator or the like on the basis of the canceling signal, detects a vibration remaining as a cancellation error between the generated canceling vibration and the vibration to be damped by an acceleration sensor, adapts the adaptive control algorithm by learning so as to reduce the detected vibration remaining as the cancellation error, and converges the pseudo vibration to a true value.

The vibration damping device illustrated in Patent Document 1 determines the frequency of the pseudo vibration assuming that a frequency recognized on the basis of an engine crankshaft rotation pulse signal coincides with the frequency of the vibration to be damped. Other vibration damping devices generally recognize the frequency of a vibration to be damped and determine the frequency of a pseudo vibration on the basis of a signal related to a vibration generating source.

In addition, a vibration damping device for canceling out a vibration caused by a vibration generating source such as an engine of a vehicle or the like and a canceling vibration generated through vibration applying means at a position to be damped is conventionally known. Patent Document 1 discloses, as such a conventional vibration damping device, a vibration damping device including: control means for receiving a frequency corresponding to a vibration caused by a vibration generating source and generating a canceling signal for canceling the vibration transmitted from the vibration generating source to a position to be damped; vibration applying means for generating a canceling vibration at the position to be damped, the vibration applying means being actuated by being supplied with a canceling signal generated by the control means; and vibration detecting means for detecting a vibration remaining as a cancellation error between the vibration caused by the vibration generating source and the canceling vibration at the position to be damped; wherein the control means corrects the canceling signal so as to reduce the vibration remaining as the cancellation error on the basis of the vibration detected by the vibration detecting means.

In addition, a vibration damping device for canceling out a vibration caused by a vibration generating source such as an engine of a vehicle or the like and a canceling vibration generated through vibration applying means at a position to be damped is conventionally known. Patent Document 1 and Patent Document 2 disclose, as such a conventional vibration damping device, a vibration damping device that calculates a pseudo vibration corresponding to a vibration to be damped using an adaptive filter, makes a canceling vibration generated at a position to be damped through vibration applying means such as an actuator or the like on the basis of the calculated pseudo vibration, detects a vibration remaining as a cancellation error between the generated canceling vibration and the vibration to be damped by an acceleration sensor, repeats the calculation of the adaptive filter so as to reduce the detected vibration remaining as the cancellation error, and converges the pseudo vibration and the adaptive filter to a true value by accumulation of calculations.

The vibration damping device performing such adaptive control generally accumulates the calculations of the adaptive filter using a convergence coefficient indicating a degree by which the adaptive filter is brought closer to the true value per calculation. The convergence coefficient determines a speed at which the adaptive filter converges to the true value. As illustrated in Patent Document 2, a fixed convergence coefficient is generally used as the convergence coefficient.

PRIOR ART DOCUMENTS

Patent Documents

Patent Document 1: Japanese Patent Laid-Open No. 2003-202902
Patent Document 2: Japanese Patent Laid-Open No. 2008-250131

SUMMARY OF DISCLOSURE

Technical Problems

However, the above-described conventional vibration damping devices have the following problems.

There is a first problem. For example, the frequency recognized on the basis of the signal related to the vibration generating source such as an engine crankshaft rotation pulse signal, an ignition pulse signal of the engine, or the like does not necessarily coincide with the frequency of the vibration to be damped. In addition, the actual frequency of the vibration to be damped may not coincide with the recognized frequency for various reasons such as an error caused by sampling at a time of capturing the pulse signal and a discretization error caused by an operation at a time of frequency recognition. When the actual frequency of the vibration to be damped is different from the recognized frequency, a phase difference between the phase of the vibration to be damped and the phase of the pseudo vibration gradually increases. The increase in the phase difference results in an increase in the vibration as the cancellation error. Thus, the adaptability of the adaptive control algorithm is degraded, and a vibration damping characteristic and control stability are impaired.

There is a second problem different from the first problem. The vibration generated by the vibration applying means is changed in amplitude or phase thereof in a process of being transmitted to the position to be damped due to transmission characteristics on a vibration transmission path from the vibration applying means to the position to be damped, and there may be a low sensitivity region in which the vibration generated by the vibration applying means is not easily transmitted because the vibration generated by the vibration applying means is greatly attenuated before being transmitted to the position to be damped depending on a position where the vibration applying means is disposed. In this low sensitivity region, a vibration damping effect obtained by vibration application by the vibration applying means is lessened, the canceling vibration generated at the position to be damped through the vibration applying means is decreased, and the cancellation error between the canceling vibration and the vibration at the position to be damped is not eliminated at all. The conventional vibration damping devices therefore try to continue increasing the vibration generated by the vibration applying means. Once the vibration damping devices fall into this state, an adverse effect may be produced on the vibration of other parts. In addition, when the frequency changes and comes out of the low sensitivity region in this state, a canceling vibration larger than necessary is applied to the position to be damped. Thus, not only is the stability of vibration damping impaired, but also the control may fall into a divergent state in a worst case.

There is a third problem in addition to the above problems. In a vibration damping device having a convergence coefficient fixed at all times as in the conventional devices, the vibration to be damped changes according to the rotational frequency of the engine and a degree of opening by an accelerator, for example. When the canceling vibration to be generated needs to be changed greatly so as to correspond to this change, the adaptive filter converges slowly, so that response is degraded and a desired vibration damping effect cannot be exerted. In addition, when the canceling vibration to be generated does not need to be changed greatly because of a very little change in the vibration to be damped or the like, the adaptive filter converges rapidly, and the behavior thereof is increased, which invites problems such as an overshoot and the like and impairs the stability of vibration damping control.

A first disclosure has been made with attention directed to the first problem. It is an object of the first disclosure to provide a vibration damping device that adjusts the frequency of a pseudo vibration to the frequency of a vibration to be damped even when the frequency of the vibration to be damped is erroneously recognized as a frequency different from an actual frequency, so that the adaptability of an adaptive control algorithm is improved, and a vibration damping characteristic and stability are improved, and a vehicle provided with the vibration damping device.

A second disclosure has been made with attention directed to the second problem. It is an object of the second disclosure to provide a vibration damping device that eliminates the problem of impairing the stability of vibration damping due to a low sensitivity region in which a vibration damping effect obtained through vibration application by vibration applying means is lessened, and in which vibration damping device the stability of vibration damping is thereby improved, and a vehicle provided with the vibration damping device.

A third disclosure has been made with attention directed to the third problem. It is an object of the third disclosure to provide a vibration damping device that properly deals with a case where a generated canceling vibration needs to be changed greatly due to a significant change in vibration to be damped, a case where the generated canceling vibration does not need to be changed greatly, or a mixture of these cases, so that the response or stability of vibration damping control is improved, and a vehicle provided with the vibration damping device.

Technical Solution

In order to achieve such an object, the first disclosure adopts the following means. According to the first disclosure, there is provided a vibration damping device for canceling out a vibration caused by a vibration generating source and a canceling vibration generated through vibration applying means at a position to be damped, the vibration damping device calculating a pseudo vibration necessary to cancel the vibration transmitted from the vibration generating source to the position to be damped using an adaptive control algorithm, generating the canceling vibration at the position pos to be damped through the vibration applying means on a basis of the calculated pseudo vibration, detecting a vibration remaining as a cancellation error between the generated canceling vibration and the vibration transmitted from the vibration generating source to the position to be damped, and adapting the adaptive control algorithm by learning so as to reduce the detected vibration remaining as the cancellation error, the vibration damping device characterized by including: frequency recognizing means for recognizing a frequency of the vibration at the position to be damped, the frequency of the vibration at the position to be damped serving as a basis for a frequency of the pseudo vibration, on a basis of a signal related to the vibration caused by the vibration generating source; phase difference identifying means for detecting the vibration remaining as the cancellation error at the position to be damped, identifying a phase of the vibration remaining as the cancellation error, and identifying a phase difference between the identified phase of the vibration remaining as the cancellation error and a phase of the canceling vibration generated at the position pos to be damped on a basis of the pseudo vibration; and frequency correcting means for correcting the frequency recognized by the frequency recognizing means in a direction of eliminating the phase difference on a basis of the phase difference identified by the phase difference identifying means.

According to this configuration, the frequency of the vibration transmitted from the vibration generating source to the position to be damped is recognized by the frequency recognizing means on the basis of the signal related to the vibration caused by the vibration generating source, the pseudo vibration is calculated using the adaptive control algorithm with the recognized frequency serving as a basis for the frequency of the pseudo vibration necessary to cancel the vibration transmitted from the vibration generating source to the position to be damped, the canceling vibration is generated at the position to be damped through the vibration applying means on the basis of the calculated pseudo vibration, the vibration remaining as the cancellation error between the generated canceling vibration and the vibration at the position to be damped is detected, and the adaptive control algorithm is adapted by learning so as to reduce the detected vibration remaining as the cancellation error, whereby vibration damping control is performed. In performing the vibration damping control, the phase difference identifying means detects the vibration remaining as the cancellation error at the position to be damped, identifies the phase of the vibration remaining as the cancellation error, and identifies the phase difference between the identified phase of the vibration remaining as the cancellation error and the phase of the canceling vibration generated at the position to be damped on the basis of the above pseudo vibration. The frequency correcting means corrects the frequency recognized by the frequency recognizing means in a direction of eliminating the phase difference according to the identified phase difference. Thus, even when the frequency of the vibration transmitted from the vibration generating source to the position to be damped is erroneously recognized as a frequency different from an actual frequency, the frequency of the pseudo vibration is adjusted to the frequency of the vibration transmitted from the vibration generating source to the position to be damped, so that the adaptability of the adaptive control algorithm can be improved, and a vibration damping characteristic and stability can be improved.

In a case where the vibration caused by the engine of an automobile is to be damped, in particular, the rotational frequency of the engine is greatly changed by the operation of an accelerator, and the frequency of the vibration varies sharply as the rotational frequency is changed, thus making vibration damping control difficult. However, the present disclosure corrects the recognized frequency, and is thus effective in that even sharp variations in the frequency of the vibration can be followed.

In order to improve the vibration damping characteristic without impairing the stability of the vibration damping control, the frequency correcting means preferably corrects the frequency recognized by the frequency recognizing means using an amount of correction not exceeding an upper limit correction amount per correction, the upper limit correction amount per correction being set in advance, when there is a phase difference identified by the phase difference identifying means.

In order to correct the frequency quickly and appropriately, the frequency correcting means desirably corrects the frequency recognized by the frequency recognizing means using an amount of correction corresponding to an amount of shift of the phase difference identified by the phase difference identifying means.

In order to be able to omit an operation and prevent frequency correction producing only a limited effect from being performed, it is effective for the frequency correcting means to correct the frequency recognized by the frequency recognizing means when an amount of shift of the phase difference identified by the phase difference identifying means is larger than a threshold value set in advance, and not to correct the recognized frequency when the amount of shift of the phase difference is equal to or smaller than the threshold value.

The above-described vibration damping device can be provided to a vehicle to provide a comfortable ride to occupants of the vehicle.

In order to achieve such an object, the second disclosure adopts the following means. According to the second disclosure, there is provided a vibration damping device for canceling out a vibration caused by a vibration generating source and a canceling vibration generated by vibration applying means at a position to be damped, the vibration damping device including: control means for receiving a frequency corresponding to the vibration and generating a canceling signal for canceling the vibration transmitted from the vibration generating source to the position to be damped; vibration applying means for generating the canceling vibration at the position to be damped, the vibration applying means being actuated by being supplied with the canceling signal generated by the control means; vibration detecting means for detecting a vibration remaining as a cancellation error between the vibration caused by the vibration generating source and the canceling vibration at the position to be damped; the control means correcting the canceling signal so as to reduce the vibration remaining as the cancellation error on a basis of the vibration detected by the vibration detecting means; storing means for storing transmission characteristics on a vibration transmission path from the vibration applying means to the position to be damped as sensitivity information in association with frequency; and sensitivity determining means for determining on a basis of the sensitivity information whether a present frequency is in a low sensitivity region in which the vibration generated by the vibration applying means is not easily transmitted; characterized in that when the sensitivity determining means determines that the present frequency is in the low sensitivity region, the control means corrects the canceling signal in a direction of suppressing the canceling vibration generated by the vibration applying means.

With such a configuration, the transmission characteristics on the vibration transmission path from the vibration applying means to the position to be damped are stored as sensitivity information in association with frequency, and when it is determined on the basis of the sensitivity information that the present frequency is in the low sensitivity region in which the vibration generated by the vibration applying means is not easily transmitted, the canceling signal is corrected in a direction of suppressing the canceling vibration generated by the vibration applying means. Thus, in the low sensitivity region in which a vibration damping effect obtained by vibration application by the vibration applying means is lessened, the vibration generated by the vibration applying means is suppressed. It is therefore possible to prevent an adverse effect from being produced on the vibration of other parts and prevent the canceling vibration larger than necessary from being applied when the present frequency comes out of the low sensitivity region, solve problems caused by the low sensitivity region, and improve vibration damping stability.

In particular, in order to determine effectively whether the present frequency is in the low sensitivity region, the sensitivity determining means desirably determines on the basis of the sensitivity information that the present frequency is in the low sensitivity region when a degree of transfer of an amplitude component as one of the transmission characteristics on the vibration transmission path, the transmission characteristic being associated with the present frequency, is lower than a predetermined first threshold value.

In order to effectively prevent the control from becoming unstable because a result of determining whether the present frequency is in the low sensitivity region changes frequently, it is desirable that the sensitivity determining means determine on the basis of the sensitivity information that the present frequency is not in the low sensitivity region when the degree of transfer of the amplitude component as one of the transmission characteristics on the vibration transmission path, the transmission characteristic being associated with the present frequency, is higher than a second threshold value as a degree of transfer higher than the first threshold value, that a non-changing region in which a result of determination is not changed should be provided between the first threshold value and the second threshold value, and that the control means should not correct the canceling signal when the sensitivity determining means determines that the present frequency is not in the low sensitivity region.

In order to realize the above determination by utilizing a mechanism for preventing a problem caused by the flowing of a very large vibration damping current command, it is desirable that the canceling signal be a vibration damping current command, that the vibration damping device further include current excess detecting means for deriving a predetermined current upper limit value from the frequency, and inputting a current upper limit exceeding signal to the control means when a peak current value of the vibration damping current command exceeds the current upper limit value, that the control means receive the input current upper limit exceeding signal and limit the vibration damping current command, and that the current excess detecting means correct the current upper limit value in a direction of limiting the vibration damping current command when the sensitivity determining means determines that the present frequency is in the low sensitivity region.

The above-described vibration damping device is particularly suitable for application in a state of being mounted in a vehicle when a vibration originating from an engine is to be damped.

In order to achieve such an object, the third disclosure adopts the following means. According to the third disclosure, there is provided a vibration damping device for canceling out a vibration caused by a vibration generating source and a canceling vibration generated through vibration applying means at a position to be damped, the vibration damping device including: pseudo vibration calculating means for calculating a pseudo vibration necessary to cancel the vibration transmitted from the vibration generating source to the position to be damped using an adaptive filter; canceling vibration generating command means for making the canceling vibration generated at the position to be damped through the vibration applying means on a basis of the pseudo vibration calculated by the pseudo vibration calculating means; vibration detecting means for detecting a vibration remaining as a cancellation error between the vibration caused by the vibration generating source and the canceling vibration at the position to be damped; the pseudo vibration calculating means repeating calculation of the adaptive filter so as to reduce the vibration remaining as the cancellation error on a basis of the vibration detected by the vibration detecting means and a convergence coefficient for determining a speed of convergence of the adaptive filter to a true value, and converging the pseudo vibration and the adaptive filter to the true value by accumulation of calculations. The vibration damping device is characterized by including: deviation information obtaining means for obtaining deviation information corresponding to a deviation between the vibration transmitted from the vibration generating source to the position to be damped and the canceling vibration generated at the position to be damped on a basis of the pseudo vibration; and convergence coefficient changing means for changing the convergence coefficient so as to increase the speed of convergence of the adaptive filter as the deviation is increased, on a basis of the deviation information obtained by the deviation information obtaining means.

According to this configuration, vibration damping control is performed in which the pseudo vibration necessary to cancel the vibration transmitted from the vibration generating source to the position to be damped is calculated by the pseudo vibration calculating means using the adaptive filter, the canceling vibration is made to be generated by the canceling vibration generating command means at the position to be damped through the vibration applying means on the basis of the calculated pseudo vibration, the vibration remaining as the cancellation error between the vibration caused by the vibration generating source and the canceling vibration at the position to be damped is detected by the vibration detecting means, the adaptive filter is calculated by the pseudo vibration calculating means so as to reduce the vibration remaining as the cancellation error on the basis of the detected vibration and the convergence coefficient for determining the speed of convergence of the adaptive filter to the true value, and the pseudo vibration and the adaptive filter are converged to the true value by accumulation of calculations. In this case, directing attention to a fact that the deviation between the vibration remaining as the cancellation error and the canceling vibration generated at the position to be damped on the basis of the pseudo vibration is increased when the canceling vibration needs to be changed greatly so as to correspond to a change in the vibration to be damped, the deviation information corresponding to the deviation is obtained by the deviation information obtaining means, and the convergence coefficient is changed by the convergence coefficient changing means on the basis of the obtained deviation information so as to increase the speed of convergence of the adaptive filter as the deviation is increased. Thus, higher response is achieved by increasing the speed of convergence of the adaptive filter when the canceling vibration generated at the position to be damped needs to be changed greatly. The response of the vibration damping control can be thereby improved.

In addition, according to the present disclosure, there is provided a vibration damping device for canceling out a vibration caused by a vibration generating source and a canceling vibration generated through vibration applying means at a position to be damped, the vibration damping device including: pseudo vibration calculating means for calculating a pseudo vibration necessary to cancel the vibration transmitted from the vibration generating source to the position to be damped using an adaptive filter; canceling vibration generating command means for making the canceling vibration generated at the position to be damped through the vibration applying means on a basis of the pseudo vibration calculated by the pseudo vibration calculating means; vibration detecting means for detecting a vibration remaining as a cancellation error between the vibration caused by the vibration generating source and the canceling vibration at the position to be damped; the pseudo vibration calculating means repeating calculation of the adaptive filter so as to reduce the vibration remaining as the cancellation error on a basis of the vibration detected by the vibration detecting means and a convergence coefficient for determining a speed of convergence of the adaptive filter to a true value, and converging the pseudo vibration and the adaptive filter to the true value by accumulation of calculations. The vibration damping device is characterized by including: deviation information obtaining means for obtaining deviation information corresponding to a deviation between the vibration transmitted from the vibration generating source to the position to be damped and the canceling vibration generated at the position to be damped on a basis of the pseudo vibration; and convergence coefficient changing means for changing the convergence coefficient so as to decrease the speed of convergence of the adaptive filter as the deviation is decreased, on a basis of the deviation information obtained by the deviation information obtaining means.

According to this configuration, directing attention to a fact that the deviation between the vibration remaining as the cancellation error and the canceling vibration generated at the position to be damped on the basis of the pseudo vibration is decreased when the canceling vibration does not need to be changed greatly so as to correspond to a change in the vibration to be damped, the deviation information corresponding to the deviation is obtained by the deviation information obtaining means, and the convergence coefficient is changed by the convergence coefficient changing means on the basis of the obtained deviation information so as to decrease the speed of convergence of the adaptive filter as the deviation is decreased. Thus, the behavior of the canceling vibration is reduced by decreasing the speed of convergence of the adaptive filter when the canceling vibration to be applied does not need to be changed greatly. Thereby the stability of the vibration damping control can be improved.

Further, according to the present disclosure, there is provided a vibration damping device for canceling out a vibration caused by a vibration generating source and a canceling vibration generated through vibration applying means at a position to be damped, the vibration damping device including: pseudo vibration calculating means for calculating a pseudo vibration necessary to cancel the vibration transmitted from the vibration generating source to the position to be damped using an adaptive filter; canceling vibration generating command means for making the canceling vibration generated at the position to be damped through the vibration applying means on a basis of the pseudo vibration calculated by the pseudo vibration calculating means; vibration detecting means for detecting a vibration remaining as a cancellation error between the vibration caused by the vibration generating source and the canceling vibration at the position to be damped; the pseudo vibration calculating means repeating calculation of the adaptive filter so as to reduce the vibration remaining as the cancellation error on a basis of the vibration detected by the vibration detecting means and a convergence coefficient for determining a speed of convergence of the adaptive filter to a true value, and converging the pseudo vibration and the adaptive filter to the true value by accumulation of calculations. The vibration damping device is characterized by including: deviation information obtaining means for obtaining deviation information corresponding to a deviation between the vibration transmitted from the vibration generating source to the position to be damped and the canceling vibration generated at the position to be damped on a basis of the pseudo vibration; and convergence coefficient changing means for changing the convergence coefficient so as to increase the speed of convergence of the adaptive filter as the deviation is increased and so as to decrease the speed of convergence of the adaptive filter as the deviation is decreased, on a basis of the deviation information obtained by the deviation information obtaining means.

According to this configuration, directing attention to a fact that the deviation between the vibration remaining as the cancellation error and the canceling vibration generated at the position to be damped on the basis of the pseudo vibration is increased when the canceling vibration needs to be changed greatly so as to correspond to a change in the vibration to be damped, and the deviation is decreased when the canceling vibration does not need to be changed greatly, the deviation information corresponding to the deviation is obtained by the deviation information obtaining means, and the convergence coefficient is changed by the convergence coefficient changing means on the basis of the obtained deviation information so as to increase the speed of convergence of the adaptive filter as the deviation is increased and so as to decrease the speed of convergence of the adaptive filter as the deviation is decreased. Thus, higher response is achieved by increasing the speed of convergence of the adaptive filter when the canceling vibration to be applied needs to be changed greatly. The response of the vibration damping control can be thereby improved. In addition, the behavior of the canceling vibration is reduced by decreasing the speed of convergence of the adaptive filter when the canceling vibration to be applied does not need to be changed greatly. Thereby the stability of the vibration damping control can be improved. Thus, appropriate vibration damping control can be performed even when there is a mixture of cases where the generated canceling vibration needs to be changed greatly and where the canceling vibration does not need to be changed greatly.

In a concrete configuration for realizing vibration damping using the deviation information corresponding to the deviation, the deviation information obtaining means can obtain an applied vibration force amplitude component corresponding to an amplitude value of the canceling vibration generated at the position to be damped on a basis of the pseudo vibration as the deviation information corresponding to the deviation, and the convergence coefficient changing means can change the convergence coefficient according to the applied vibration force amplitude component obtained by the deviation information obtaining means.

In another concrete configuration for realizing vibration damping using the deviation information corresponding to the deviation, the deviation information obtaining means can obtain an amplitude component of the vibration remaining as the cancellation error detected by the vibration detecting means as the deviation information corresponding to the deviation, and the convergence coefficient changing means can change the convergence coefficient according to the amplitude component of the vibration remaining as the cancellation error, the amplitude component of the vibration remaining as the cancellation error being obtained by the deviation information obtaining means.

In another concrete configuration for realizing vibration damping using the deviation information corresponding to the deviation, the deviation information obtaining means can obtain an amount of variation in frequency of the vibration at the position to be damped as the deviation information corresponding to the deviation on the basis of a signal related to the vibration caused by the vibration generating source, and the convergence coefficient changing means can change the convergence coefficient according to the amount of variation in the frequency, the amount of variation in the frequency being obtained by the deviation information obtaining means.

In another concrete configuration for realizing vibration damping using the deviation information corresponding to the deviation, the deviation information obtaining means can obtain a phase difference between a phase of the vibration remaining as the cancellation error and a phase of the vibration generated at the position to be damped on the basis of the pseudo vibration as the deviation information corresponding to the deviation, and the convergence coefficient changing means can change the convergence coefficient according to the phase difference obtained by the deviation information obtaining means.

The above-described vibration damping device can be provided to a vehicle to provide a comfortable ride to occupants of the vehicle.

Advantageous Effects

According to the first disclosure, even when the frequency of the vibration to be damped is erroneously recognized as a frequency different from an actual frequency, the frequency of the pseudo vibration is adjusted to the frequency of the vibration to be damped, so that the adaptability of the adaptive control algorithm can be improved, and a vibration damping characteristic and stability can be improved.

According to the second disclosure, it is possible to prevent an adverse effect of the vibration by the vibration applying means from being produced on the vibration of other parts and prevent the canceling vibration larger than necessary from being applied when the present frequency comes out of the low sensitivity region, solve problems caused by the low sensitivity region, and improve vibration damping stability.

According to the third disclosure, it is possible to improve the response or stability of vibration damping control without depending on whether the generated canceling vibration needs to be changed greatly according to significant changes in the vibration to be damped.

Thus, according to the first, second, and third disclosures, it is possible to provide a vibration damping device whose vibration damping control is improved in stability.

BRIEF DESCRIPTION OF THE DRAWINGS

FIGS. 12 are schematic diagrams showing transmission characteristics on a vibration transmission path from the vibration applying means to a position to be damped.

FIGS. 13 are diagrams showing an upper limit value set in a current clamp table in the same embodiment and a concept of deriving the upper limit value.

DESCRIPTION OF PREFERRED EMBODIMENTS

<First Embodiment>

A vibration damping device according to a first embodiment will hereinafter be described with reference to FIGS. 1 to 7. The first embodiment corresponds to a first disclosure.

Figure 1:
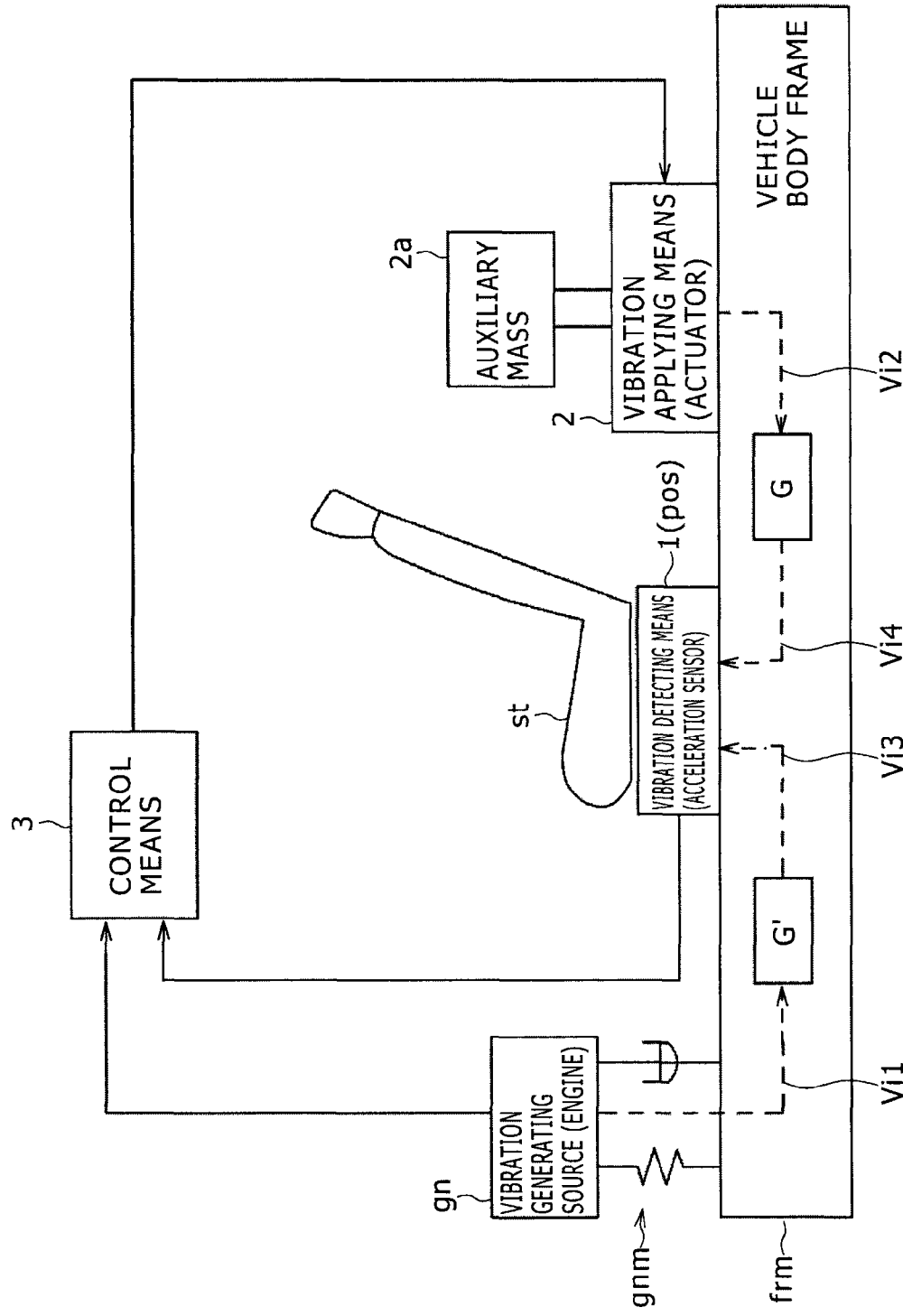
FIG. 1 is a schematic general view of a vibration damping device according to a first embodiment.

As shown in FIG. 1, the vibration damping device according to the first embodiment is mounted in a vehicle such as an automobile or the like. The vibration damping device includes: vibration detecting means 1 such as an acceleration sensor or the like disposed at a position pos to be damped such as a seat st or the like; vibration applying means 2 using a linear actuator for generating a vibration Vi2 by vibrating an auxiliary mass 2a having a predetermined mass; and control means 3 for receiving an ignition pulse signal of an engine as a vibration generating source gn and a detection signal from the vibration detecting means 1, and making a canceling vibration Vi4 generated at the position pos to be damped by transmitting the vibration Vi2 generated by the vibration applying means 2 to the position pos to be damped. The vibration damping device reduces vibration at the position pos to be damped by making a vibration Vi3 caused by the vibration generating source gn such as the engine or the like mounted on a vehicle body frame form via a mounter gnm and the canceling vibration Vi4 generated through the vibration applying means 2 cancel each other out at the position pos to be damped.

Figure 2:
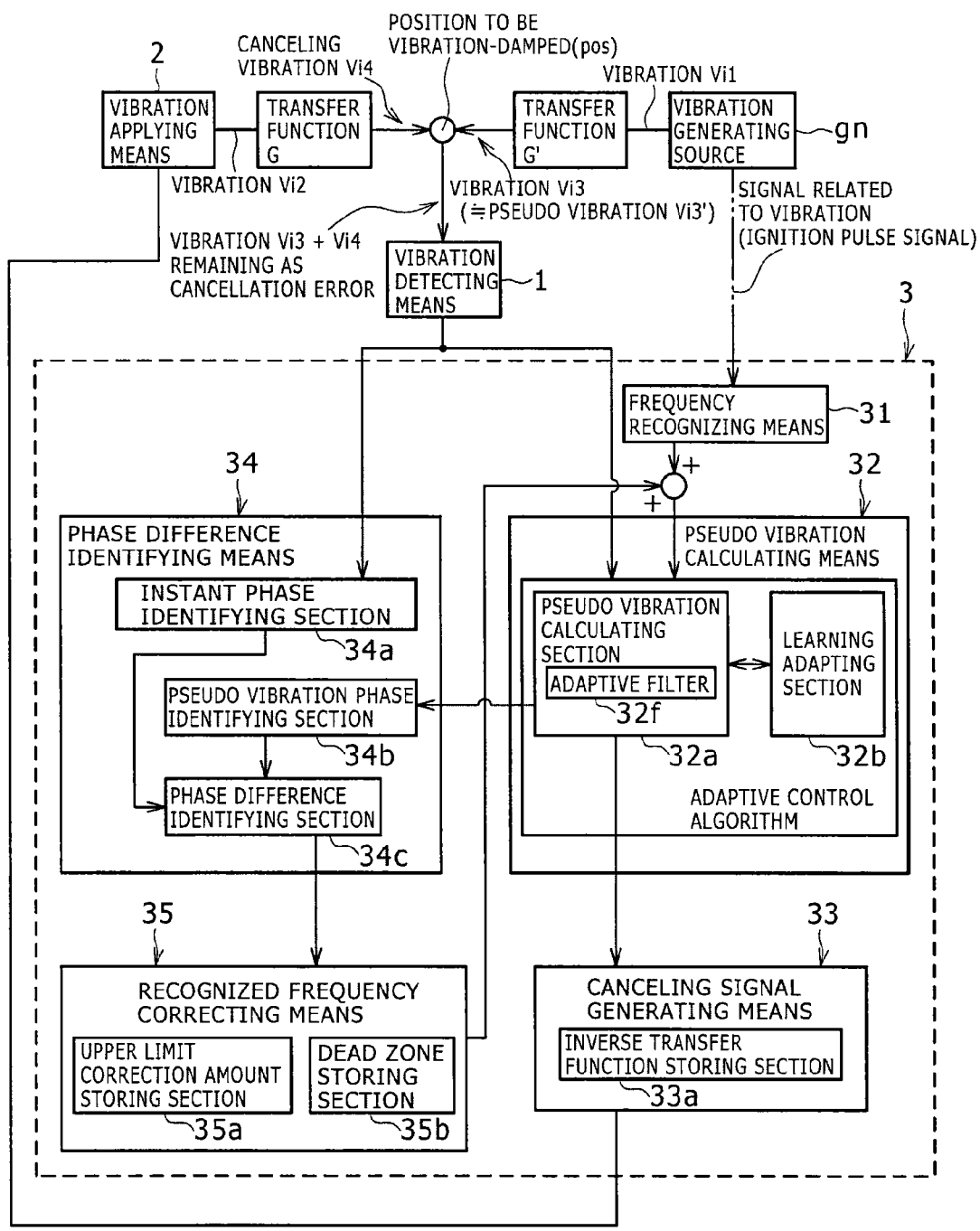
FIG. 2 is a schematic block diagram of a configuration and functions of control means according to the same embodiment.

As shown in FIG. 2, in order to generate, at the position pos to be damped, the canceling vibration Vi4 for accurately canceling the vibration Vi3 transmitted from the vibration generating source gn to the position pos to be damped, the control means 3 calculates a pseudo vibration Vi3' simulating the vibration Vi3 transmitted from the vibration generating source gn to the position pos to be damped by using an adaptive algorithm. The control means 3 makes the canceling vibration Vi4 generated at the position pos to be damped through the vibration applying means 2 on the basis of the calculated pseudo vibration Vi3'. In addition, the control means 3 performs vibration damping control that detects a vibration (Vi3+Vi4) remaining as a cancellation error between the canceling vibration Vi4 transmitted from the vibration applying means 2 to the position pos to be damped and the vibration Vi3 by the vibration detecting means 1, and which vibration damping control adapts the adaptive algorithm by learning so as to reduce the detected vibration (Vi3+Vi4) remaining as the cancellation error and converges the pseudo vibration to true values. The pseudo vibration necessary to cancel the vibration Vi3 transmitted from the vibration generating source gn to the position pos to be damped in the present embodiment is the pseudo vibration Vi3' simulating the vibration Vi3, but may also be a pseudo vibration directly simulating the canceling vibration Vi4 transmitted from the vibration applying means 2 to the position pos to be damped without the vibration Vi3 being simulated.

As shown in FIG. 2, the control means 3 for performing the vibration damping control by this adaptive control includes frequency recognizing means 31, pseudo vibration calculating means 32, and canceling signal generating means 33.

The frequency recognizing means 31 recognizes the frequency of the vibration at the position pos to be damped on the basis of a signal related to a vibration Vi1 caused by the vibration generating source gn. The recognized frequency is used as a basis for the frequency of the pseudo vibration when the pseudo vibration calculating means 32 calculates the pseudo vibration. In the present embodiment, the ignition pulse signal of the engine as a signal related to the vibration Vi1 caused by the vibration generating source gn is input from an ECU or the like. Of course, another signal such for example as a detection pulse signal from a sensor for detecting the rotational frequency of an engine crank may be used in place of the ignition pulse signal of the engine.

The pseudo vibration calculating means 32 uses the frequency recognized by the frequency recognizing means 31 as the frequency of the pseudo vibration and calculates the pseudo vibration by the adaptive algorithm, and makes the adaptive algorithm learn so as to reduce the vibration remaining as the cancellation error input from the vibration detecting means 1. Specifically, the pseudo vibration calculating means 32 includes a pseudo vibration calculating section 32a and a learning adapting section 32b. The pseudo vibration calculating section 32a subjects reference waves of a frequency equal to the frequency recognized by the frequency recognizing means 31 to filtering using an adaptive filter 32f, and thereby changes the amplitude and phase of the reference waves and calculates the pseudo vibration. The learning adapting section 32b successively updates the adaptive filter 32f so as to eliminate the vibration remaining as the cancellation error input from the vibration detecting means 1.

Figure 5:
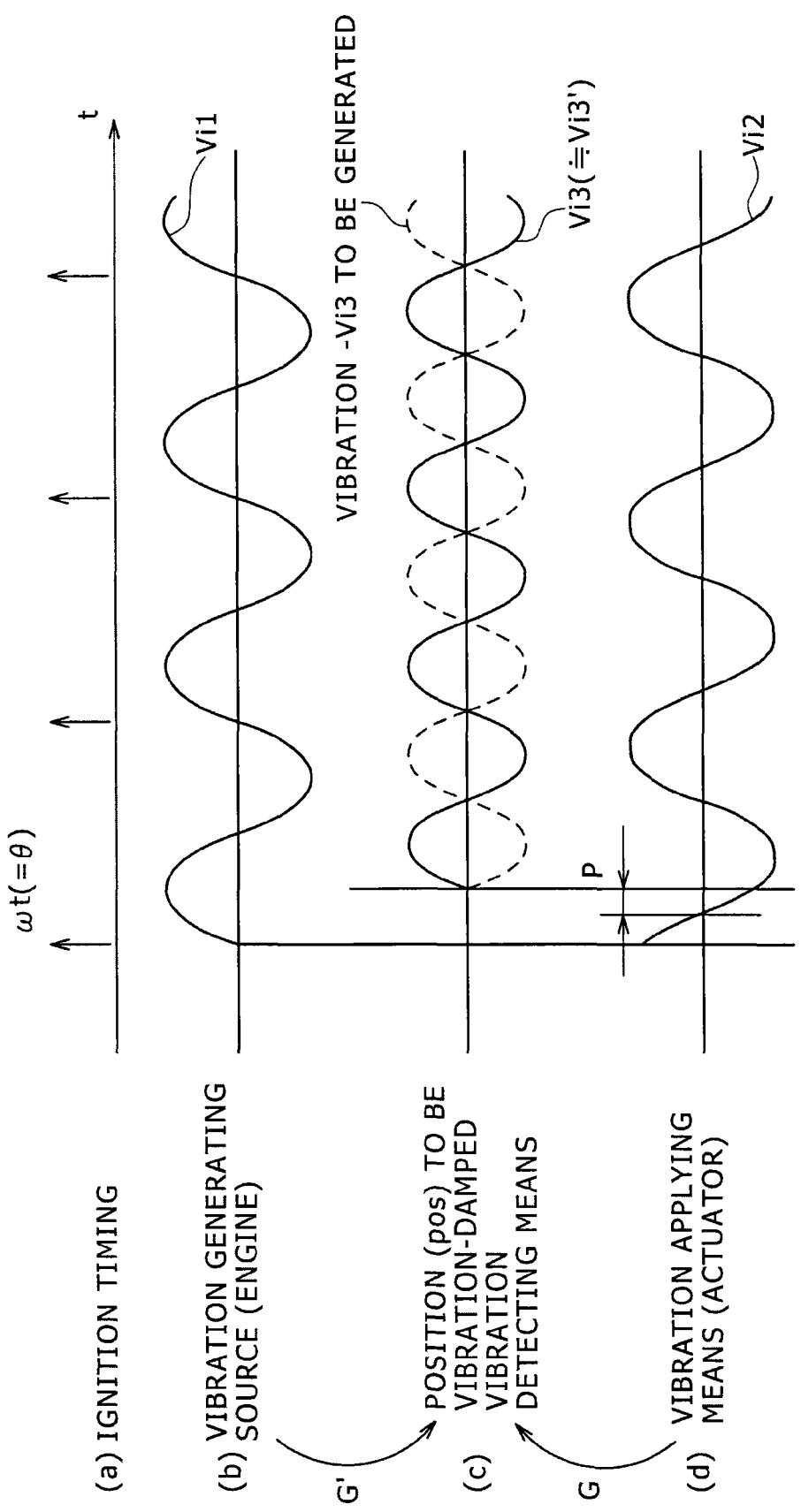
FIGS. 5 are diagrams of assistance in explaining a vibration transmitted from vibration applying means to a position to be damped.

The canceling signal generating means 33 generates a canceling signal as a command for generating the canceling vibration Vi4 at the position pos to be damped through the vibration applying means 2 on the basis of the pseudo vibration calculated by the pseudo vibration calculating means 32. When the canceling signal generated by the canceling signal generating means 33 is input to the vibration applying means 2, the vibration applying means 2 generates the canceling vibration Vi4 at the position pos to be damped. In generating the canceling signal, as shown in FIG. 5, it suffices to apply a vibration −Vi3 obtained by inverting the waveform of the vibration Vi3 to the vibration Vi3 transmitted from the vibration generating source gn to the position pos to be damped. However, the vibration Vi2 generated by the vibration applying means 2 is changed in amplitude or phase in a process of being transmitted to the position pos to be damped. It is thus necessary for the vibration applying means 2 to generate the vibration Vi2 such that the canceling vibration Vi4 is applied to the position pos to be damped in consideration of this change. Specifically, an inverse transfer function of a vibration transfer function G that changes the amplitude and phase of the vibration transmitted from the vibration applying means 2 to the position pos to be damped is stored in an inverse transfer function storing section 33a in advance, and the canceling vibration vi2 is calculated by incorporating the inverse transfer function into a vibration obtained by inversing the waveform of the pseudo vibration Vi3' simulating the vibration Vi3 at the position pos to be damped. In this case, the amplitude component of the inverse transfer function is stored as 1/G in the inverse transfer function storing section 33a, and the phase component of the inverse transfer function is stored as P in the inverse transfer function storing section 33a. Incidentally, a vibration transfer function that changes the amplitude or phase of the vibration transmitted from the vibration generating source gn to the position pos to be damped is denoted by G'.

As shown in FIG. 2, in addition to the above configuration, the present embodiment further includes phase difference identifying means 34 and recognized frequency correcting means 35.

Figure 6:
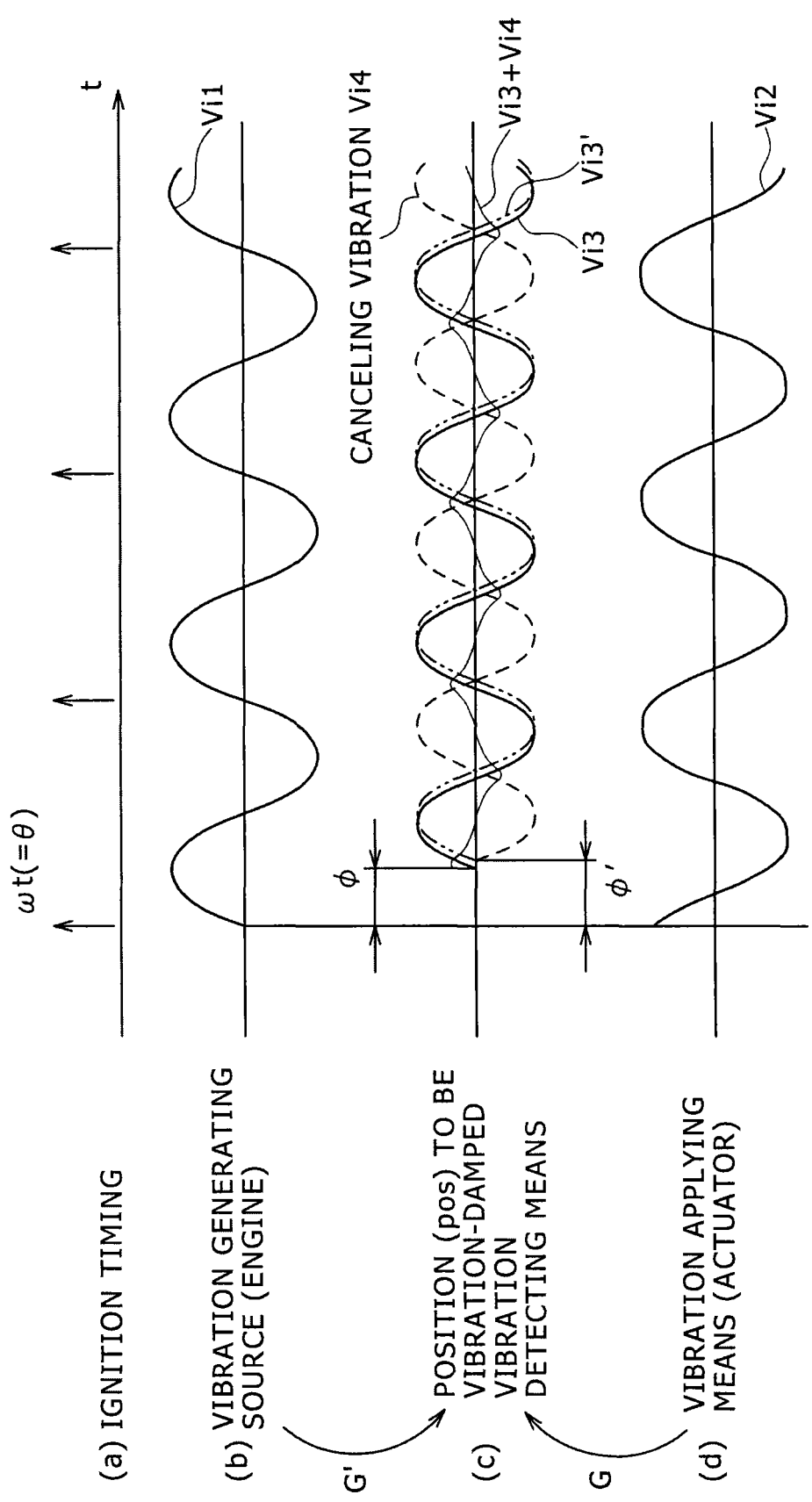
FIGS. 6 are diagrams of assistance in explaining a vibration remaining as a cancellation error between a vibration transmitted from a vibration generating source to the position to be damped and the canceling vibration.
Figure 7:
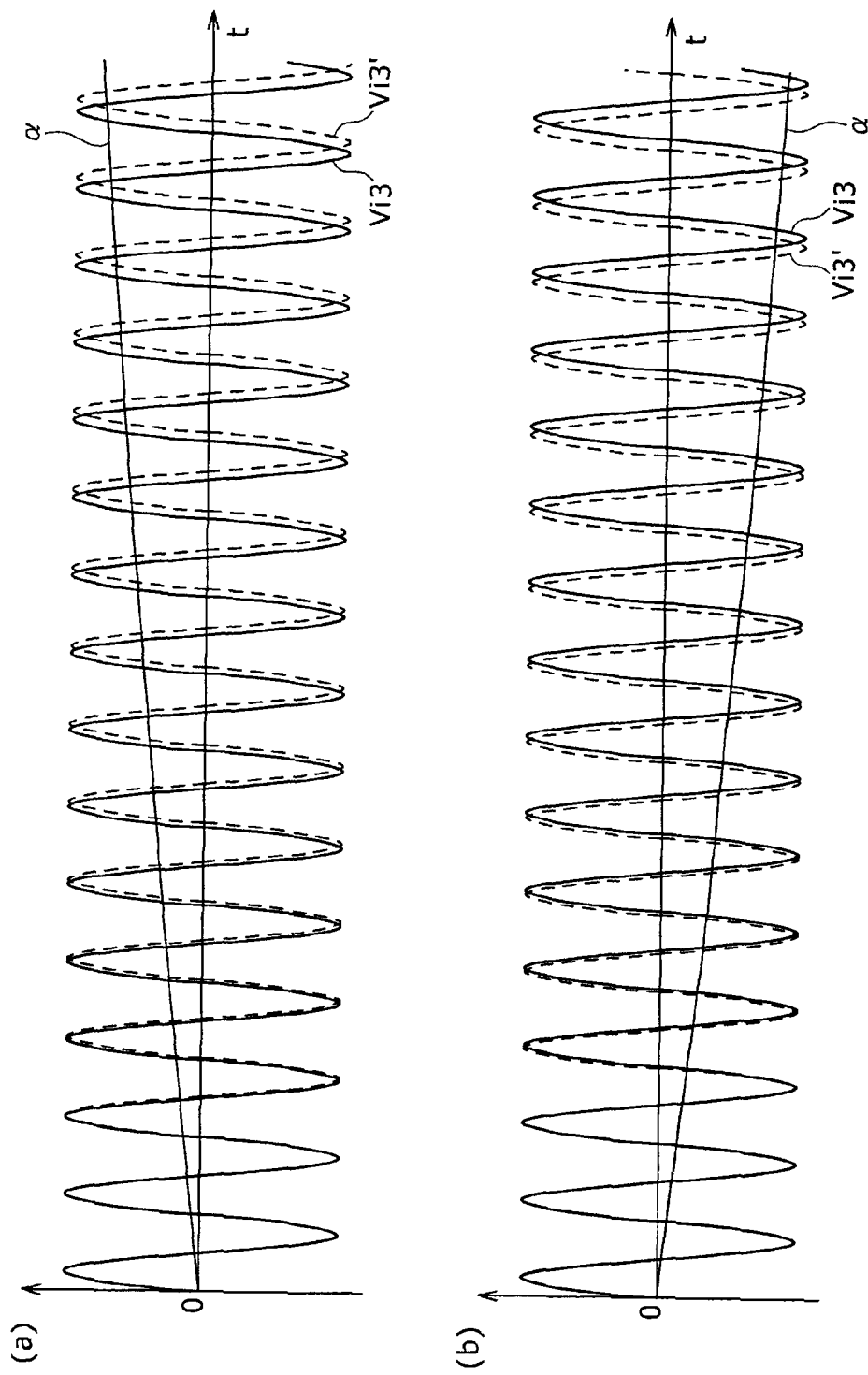
FIGS. 7 are diagrams of assistance in explaining a phase difference occurring when there is a difference between the frequency of the vibration at the position to be damped and the frequency of a pseudo vibration simulating the vibration.

As shown in FIG. 6, the phase difference identifying means 34 detects the vibration (Vi3+Vi4) remaining as the cancellation error at the position pos to be damped, identifies the phase φ of the detected vibration, and instantly identifies a phase difference Δφ (=φ−φ') between the identified phase φ of the vibration (Vi3+Vi4) remaining as the cancellation error at the position pos to be damped and the phase φ' of the canceling vibration Vi4 generated at the position pos to be damped on the basis of the pseudo vibration Vi3'. The phase φ and the phase φ' have ωt (=θ) as a reference. Specifically, as shown in FIG. 2, the phase difference identifying means 34 includes an instant phase identifying section 34a, a pseudo vibration phase identifying section 34b, and a phase difference identifying section 34c. The instant phase identifying section 34a instantly identifies the phase of the vibration detected by the vibration detecting means 1 on the basis of the vibration detected by the vibration detecting means 1. The pseudo vibration phase identifying section 34b identifies the phase of the pseudo vibration by referring to a result of calculation by the pseudo vibration calculating section 32a. The phase difference identifying section 34c identifies a phase difference between the phase of the vibration at the position pos to be damped which phase is identified by the instant phase identifying section 34a and the phase of the pseudo vibration identified by the pseudo vibration phase identifying section 34b.

The frequency correcting means 35 corrects the frequency recognized by the frequency recognizing means 31 in a direction of eliminating the phase difference on the basis of the phase difference identified by the phase difference identifying means 34. The frequency correcting means 35 includes an upper limit correction amount storing section 35a and a dead zone storing section 35b. The frequency correcting means 35 is configured to correct the frequency using an amount of correction not exceeding an upper limit correction amount per correction which upper limit correction amount is stored in the upper limit correction amount storing section 35b in advance when there is a phase difference identified by the phase difference identifying means 34, and to correct the frequency when an amount of shift of the phase difference exceeds a threshold value stored in the dead zone storing section 35c in advance and not to correct the frequency when the amount of shift of the phase difference is equal to or smaller than the threshold value.

A concrete control block for realizing such control means 3 will be described with reference to FIG. 3.

Figure 3:
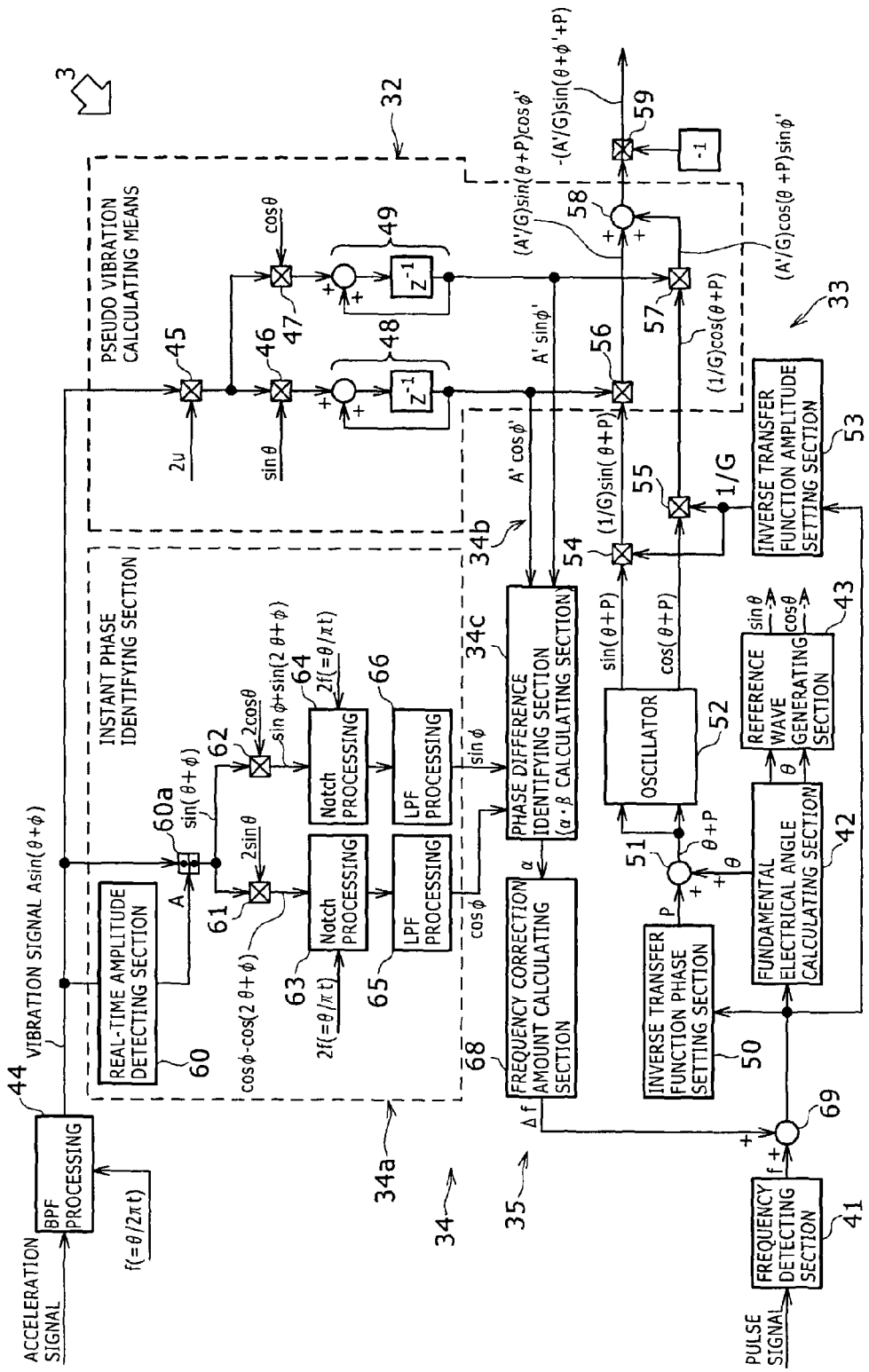
FIG. 3 is a detailed block diagram of a configuration of the control means according to the same embodiment.

As shown in FIG. 3, a frequency detecting section 41 as the frequency recognizing means 31 recognizes the frequency f of the vibration at the position pos to be vibration-damped on the basis of an engine pulse signal input to the frequency detecting section 41. A fundamental electrical angle calculating section 42 is supplied with the recognized frequency f and calculates a fundamental electrical angle θ. A reference wave generating section 43 is supplied with the calculated fundamental electrical angle θ, and generates a reference sine wave $\sin \theta$ and a reference cosine wave $\cos \theta$ as reference waves. These reference waves serve as a reference for the amplitude and phase of waveforms and the like in signal processing in the control means 3.

The vibration at the position pos to be vibration-damped which vibration is detected by the vibration detecting means 1 as an acceleration sensor includes other vibrations than the vibration caused by the vibration generating source gn. Therefore, only the vibration caused by the vibration generating source gn is detected as a vibration signal by subjecting the output signal of the vibration detecting means 1 to a BPF (band-pass filter) 44 for extracting only a signal of a component of the frequency f recognized by the frequency detecting section 41.

In order to simulate the vibration signal, suppose that the vibration signal is $A \sin(\theta+\phi)$ where $\theta=\omega t$, and the following equations are used.

First, when expressed by using a product-sum theorem, the vibration signal $A \sin(\theta+\phi)$ multiplied by $\sin \theta$ can be transformed as follows:

$$A \sin(\theta+\phi) \times \sin \theta = (-A/2)(\cos(2\theta+\phi)-\cos \phi)$$

When this equation is multiplied by two, $$2A \sin(\theta+\phi) \times \sin \theta = A \cos \phi - A \cos(2\theta+\phi).$$

When this equation is integrated using a convergence coefficient $\mu$, the integral of a second term $A \cos(2\theta+\phi)$ on a right side is $(\mu A/2\omega)\sin(2\theta+\phi)$. When $\mu$ is set to a very small value as compared with A, $(\mu A/2\omega)\sin(2\theta+\phi)$ can be ignored because $(\mu A/2\omega)\sin(2\theta+\phi)$ has a small amplitude and is the integral of a periodic function, and the right side as a whole converges to A'cos $\phi'$ having an amplitude component of a value A' close to a true value A and a phase component of a value $\phi'$ close to a true value $\phi$.

Similarly, when expressed by using a product-sum theorem, the vibration signal A sin($\theta+\phi$) multiplied by cos $\theta$ can be transformed as follows:

$$A \sin(\theta+\phi) \times \cos \theta = (A/2)(\sin(2\theta+\phi)+\sin \phi)$$

When this equation is multiplied by two, $$2A \sin(\theta+\phi) \times \cos \theta = A \sin \phi + A \sin(2\theta+\phi).$$

When this equation is integrated using the convergence coefficient $\mu$, the integral of a second term A sin($2\theta+\phi$) on a right side is the integral of a periodic function and can therefore be ignored, as in the above, and the right side as a whole converges to A' sin $\phi'$ having the amplitude component of the value A' close to the true value A and the phase component of the value $\phi'$ close to the true value $\phi$.

An addition of A' cos $\phi'$ multiplied by sin $\theta$ and A' sin $\phi'$ multiplied by cos $\theta$, A' cos $\phi'$ and A' sin $\phi'$ being obtained as described above, is expressed as follows by using an addition theorem.

$$\sin \theta \times A' \cos \phi' + \cos \theta \times A' \sin \phi' = A' \sin \theta \times \cos \phi' + A' \cos \theta \times \sin \phi' = A' \sin(\theta+\phi')$$

Thus, the pseudo vibration A' sin($\theta+\phi'$) simulating the vibration signal A sin($\theta+\phi'$) can be calculated by performing the above operation on the vibration signal. A' cos $\phi'$ and A' sin $\phi'$ are a so-called adaptive filter in adaptive control, which adaptive filter adapts itself to converge the amplitude A' and phase $\phi'$ of the pseudo vibration to the amplitude A and the phase $\phi$ as true values according to the input of the vibration signal. In addition, the adaptive filter is transformed to the pseudo vibration by multiplying the adaptive filter by the reference waves and adding together results of the multiplication. The adaptive filter can therefore be said to express an amplitude difference and a phase difference between the pseudo vibration and the reference waves.

The pseudo vibration calculating means 32 is configured as shown in FIG. 3 to calculate the pseudo vibration using the above operation processing while updating the adaptive filter 32f by learning on the basis of the vibration signal A sin($\theta+\phi$). Specifically, a multiplier 45 multiplies the vibration signal A sin($\theta+\phi$) by a convergence coefficient $2\mu$. Multipliers 46 and 47 respectively multiply a result of the multiplication in the multiplier 45 by the reference sine wave sin $\theta$ and the reference cosine wave cos $\theta$ output from the reference wave generating section 43, and output the results to integrators 48 and 49. The integrators 48 and 49 integrate the outputs from the multipliers 46 and 47, and output A' cos $\phi'$ and A' sin $\phi'$ as the adaptive filter 32f indicating the amplitude difference and the phase difference between the pseudo vibration and the reference waves.

The pseudo vibration A' sin($\theta+\phi'$) is obtained by multiplying the adaptive filter 32f by the reference sine wave sin $\theta$ and the reference cosine wave $\theta$ and thereafter adding together results of the multiplication as described above. However, in the present embodiment, the reference waves incorporating the inverse transfer function of the amplitude component and the phase component are generated before being multiplied by the adaptive filter 32f. Of course, the inverse transfer function of the amplitude component and the phase component may be incorporated after the pseudo vibration is calculated. Specifically, in the present embodiment, an inverse transfer function amplitude setting section 53 stores the amplitude component of the inverse transfer function corresponding to the frequency in advance. The inverse transfer function amplitude setting section 53 is supplied with the recognized frequency f, and identifies the amplitude component 1/G of the inverse transfer function. Similarly, an inverse transfer function phase setting section 50 stores the phase component of the inverse transfer function corresponding to the frequency in advance. The inverse transfer function phase setting section 50 is supplied with the recognized frequency f, and identifies the phase component P of the inverse transfer function. The identified phase component P and the fundamental electrical angle $\theta$ are added together by an adder 51 and then input to an oscillator 52. The oscillator 52 generates a sine wave sin($\theta+P$) and a cosine wave cos($\theta+P$) incorporating the phase component P of the inverse transfer function. Multipliers 54 and 55 respectively multiply the generated sine wave sin($\theta+P$) and the generated cosine wave cos($\theta+P$) by the amplitude component 1/G of the inverse transfer function which amplitude component is identified by the inverse transfer function amplitude setting section 53. The multipliers 54 and 55 thereby generate reference waves incorporating the inverse transfer function of the amplitude and the phase.

Multipliers 56 and 57 respectively multiply the reference waves (1/G)sin($\theta+P$) and (1/G)cos($\theta+P$) generated by the multipliers 54 and 55 and incorporating the inverse transfer function of the amplitude and the phase by A' cos $\phi'$ and A' sin $\phi'$ as the above-described adaptive filter 32f. When results of the multiplication at the multipliers 56 and 57 are added together by an adder 58, and a result of the addition is multiplied by −1 by a multiplier 59, a canceling signal as a command to generate a canceling vibration [−(A'/G)sin($\theta+\phi'+P$)] is generated, and the canceling vibration [−(A'/G)sin($\theta+\phi'+P$)] is applied by the vibration applying means 2.

In addition to the configuration for performing the vibration damping control using the above adaptive control, the control means 3 further includes the instant phase identifying section 34a, the pseudo vibration phase identifying section 34b, and the phase difference identifying section 34c forming the phase difference identifying means 34 and a frequency correction amount calculating section 68 forming the frequency correcting means 35.

The instant phase identifying section 34a forming the phase difference identifying means 34 is supplied with the vibration signal A sin($\theta+\phi$) detected via the vibration detecting means 1, and instantly identifies the phase $\phi$ of the vibration signal A sin($\theta+\phi$). Specifically, first, a divider 60a divides the vibration signal A sin($\theta+\phi$) by the amplitude A detected by a real-time amplitude detecting section 60. Thereby sin($\theta+\phi$) with an amplitude of unity is obtained.

The real-time amplitude detecting section 60 utilizes a fact that the integral value of the sine wave sin $\theta$ with an amplitude of unity in half a cycle 0 to $\pi$ is $(-\cos \pi)-(-\cos 0)=(1)-(-1)=2$ and that an average value thereof is an average from 0 to $\pi$ and is thus $2/\pi$. The real-time amplitude detecting section 60 is supplied with the vibration signal A sin($\theta+\phi$), applies absolute value processing, subjects the result of the absolute value processing to a notch filter for removing a twofold frequency component, removes a pulsating component by an LPF (low-pass filter), and multiplies the result by $2/\pi$. The real-time amplitude detecting section 60 thereby obtains the amplitude A instantly.

Multipliers 61 and 62 multiply sin($\theta+\phi$) as a result of the division by the divider 60a by 2 sin $\theta$ and 2 cos $\theta$, respectively, and obtain cos $\phi$−cos($2\theta+\phi$) and sin $\phi$+sin($2\theta+\phi$) from the product-sum theorem. Notch processing 63 for removing a twofold frequency component is applied to cos $\phi$−cos($2\theta+\phi$) as a result of the operation by the multiplier 61, and a pulsating component is removed by LPF (low-pass filter) processing 65 to obtain cos φ. Similarly, notch processing 64 for removing a twofold frequency component is applied to sin φ+sin(2θ+φ) as a result of the operation by the multiplier 62, and a pulsating component is removed by LPF (low-pass filter) processing 66 to obtain sin φ. The instant phase identifying section 34a thus instantly identifies cos φ and sin φ having the phase component of the vibration signal A sin(θ+φ).

To use A' cos φ' and A' sin φ', which are the adaptive filter 32f, as they are because A' cos φ' and A' sin φ' have the phase component of the pseudo vibration, the pseudo vibration phase identifying section 34b forming the phase difference identifying means 34 inputs the adaptive filter 32f to the phase difference identifying section 34c.

The phase difference identifying section 34c forming the phase difference identifying means 34 identifies a phase difference on the basis of cos φ and sin φ identified by the instant phase identifying section 34a and A' cos φ' and A' sin φ' as the adaptive filter 32f. Specifically, the phase φ and phase φ' indicate a phase shift with respect to the common fundamental electrical angle θ. Thus, when the phase of the pseudo vibration and the phase of the vibration at the position pos to be damped coincide with each other, φ and φ' are equal to each other. Hence, the phase difference Δφ is defined as φ−φ', and the phase difference is expressed by a sine wave component α and a cosine wave component β of the phase difference which components are calculated by using the following equations.

Sine Wave Component α=A' sin(φ−φ')=A'(sin φ cos φ'−cos φ sin φ')=sin φ(A' cos φ')−cos φ(A' sin φ')

Cosine Wave Component β=A' cos(φ−φ')=A'(cos φ cos φ'+sin φ sin φ')=cos φ(A' cos φ')+sin φ(A' sin φ')

As shown in FIG. 7(a), when the frequency of the pseudo vibration Vi3' simulating the vibration Vi3 is lower than the frequency of the vibration Vi3 at the position pos to be damped, the sine wave component α increases with a certain amount of change in a positive direction. As shown in FIG. 7(b), when the frequency of the pseudo vibration Vi3' simulating the vibration Vi3 is higher than the frequency of the vibration Vi3 at the position pos to be damped, the sine wave component α decreases with a certain amount of change in a negative direction. It is known that the above-described adaptive control algorithm makes the control diverge and renders the vibration damping impossible when the phase difference Δφ goes beyond a range of ±60 degrees. It is thus possible to determine whether Δφ is advanced or delayed according to the sign of the sine wave component α under a condition that cosine wave component β>0, and grasp the amount of shift of the phase difference Δφ from the magnitude of the sine wave component α.

Figure 4:
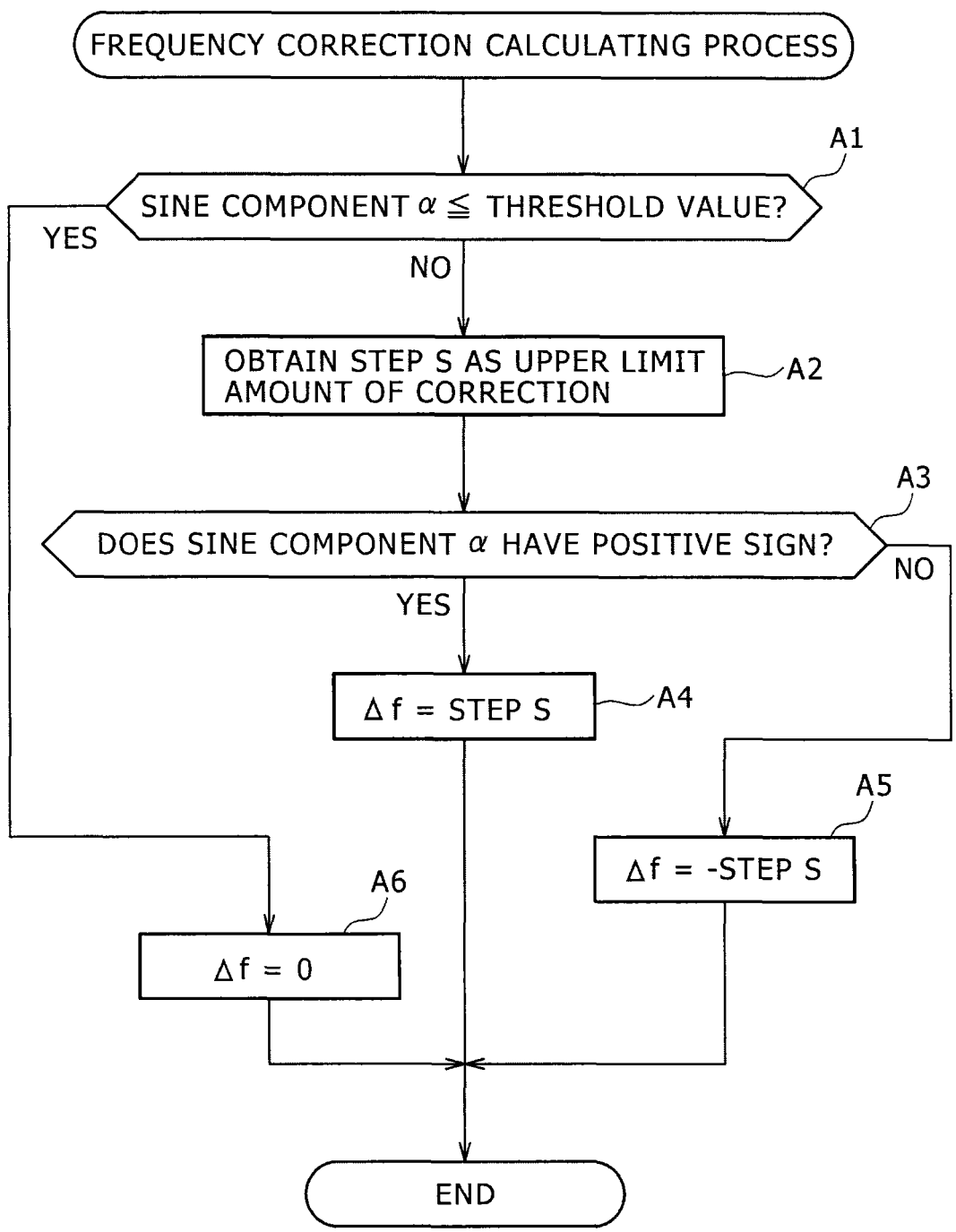
FIG. 4 is a flowchart of a frequency correction calculating process routine performed by a frequency correction amount calculating section according to the same embodiment.

As shown in FIG. 3, the frequency correction amount calculating section 68 forming the frequency correcting means 35 calculates a frequency correction amount Δf on the basis of the sine wave component α identified by the phase difference identifying section 34c, and outputs the frequency correction amount Δf to an adder 69. The recognized frequency f is corrected by adding the frequency correction amount Δf to the frequency f recognized by the frequency detecting section 41 in the adder 69. As shown in FIG. 4, the correction amount calculating section 68 determines whether the magnitude of the sine wave component α is equal to or less than the threshold value stored in the dead zone storing section 35b (A1). When determining that the magnitude of the sine wave component α is equal to or less than the threshold value (A1: YES), the frequency correction amount calculating section 68 sets the frequency correction amount Δf to zero (A6). When determining that the magnitude of the sine wave component α is not equal to or less than the threshold value (A1: NO), on the other hand, the frequency correction amount calculating section 68 obtains a step S (S>0) of a certain value as the upper limit correction amount per correction which correction amount is stored in the upper limit correction amount storing section 35a (A2). The frequency correction amount calculating section 68 then determines whether the sine wave component α has a positive sign or not (A3). When determining that the sine wave component α has a positive sign (A3: YES), the frequency correction amount calculating section 68 sets the frequency correction amount Δf to the step S, that is, sets the frequency correction amount Δf to a positive value (A4). When determining that the sine wave component α does not have a positive sign (A3: NO), on the other hand, the frequency correction amount calculating section 68 sets the frequency correction amount Δf to −step S, that is, sets the frequency correction amount Δf to a negative value (A5). The recognized frequency f is thus corrected in a direction of eliminating the phase difference Δφ.

As described above, in canceling out the vibration Vi3 caused by the vibration generating source gn and the canceling vibration Vi4 generated through the vibration applying means 2 at the position pos to be damped, the vibration damping device according to the first embodiment calculates the pseudo vibration Vi3' necessary to cancel the vibration Vi3 transmitted from the vibration generating source to the position pos to be damped using the adaptive control algorithm, generates the canceling vibration Vi4 at the position pos to be damped through the vibration applying means 2 on the basis of the calculated pseudo vibration Vi3', detects the vibration (Vi3+Vi4) remaining as a cancellation error between the generated canceling vibration Vi4 and the vibration Vi3 transmitted from the vibration generating source gn to the position pos to be damped, and adapts the adaptive control algorithm by learning so as to reduce the detected vibration (Vi3+Vi4) remaining as the cancellation error. The vibration damping device according to the first embodiment includes: the frequency recognizing means 31 for recognizing the frequency f of the vibration Vi3 at the position pos to be damped, the frequency f serving as a basis for the frequency of the pseudo vibration Vi3', on the basis of the signal related to the vibration Vi1 caused by the vibration generating source gn; the phase difference identifying means 34 for detecting the vibration (Vi3+Vi4) remaining as the cancellation error at the position pos to be damped, identifying the phase φ of the vibration (Vi3+Vi4) remaining as the cancellation error, and identifying the phase difference Δφ between the identified phase φ of the vibration (Vi3+Vi4) remaining as the cancellation error and the phase φ' of the canceling vibration Vi4 generated at the position pos to be damped on the basis of the pseudo vibration Vi3'; and the frequency correcting means 35 for correcting the frequency f recognized by the frequency recognizing means 31 in a direction of eliminating the phase difference Δφ on the basis of the phase difference Δφ identified by the phase difference identifying means 34.

According to the first embodiment, the frequency f of the vibration Vi3 transmitted from the vibration generating source gn to the position pos to be damped is recognized by the frequency recognizing means 31 on the basis of the signal related to the vibration Vi1 caused by the vibration generating source gn, the pseudo vibration Vi3' is calculated using the adaptive control algorithm with the recognized frequency f serving as a basis for the frequency of the pseudo vibration Vi3' necessary to cancel the vibration Vi3 transmitted from the vibration generating source gn to the position pos to be damped, the canceling vibration Vi4 is generated at the position pos to be vibration through the vibration applying means 2 on the basis of the calculated pseudo vibration Vi3', the vibration (Vi3+Vi4) remaining as the cancellation error between the generated canceling vibration Vi4 and the vibration Vi3 transmitted from the vibration generating source gn to the position pos to be damped is detected, and the adaptive control algorithm is adapted by learning so as to reduce the detected vibration (Vi3+Vi4) remaining as the cancellation error, whereby vibration damping control is performed. In performing the vibration damping control, the phase difference identifying means 34 detects the vibration (Vi3+Vi4) remaining as the cancellation error at the position pos to be damped, identifies the phase $\phi$ of the vibration (Vi3+Vi4) remaining as the cancellation error, and identifies the phase difference $\Delta\phi$ ($=\phi-\phi'$) between the identified phase $\phi$ of the vibration (Vi3+Vi4) remaining as the cancellation error and the phase $\phi'$ of the canceling vibration Vi4 generated at the position pos to be damped on the basis of the above pseudo vibration Vi3'. The frequency correcting means 35 corrects the frequency f recognized by the frequency recognizing means 31 in a direction of eliminating the phase difference $\Delta\phi$ according to the identified phase difference $\Delta\phi$. Thus, even when the frequency of the vibration Vi3 transmitted from the vibration generating source gn to the position pos to be damped is erroneously recognized as a frequency different from an actual frequency, the frequency of the pseudo vibration Vi3' is adjusted to the frequency of the vibration Vi3 transmitted from the vibration generating source gn to the position pos to be damped, so that the adaptability of the adaptive control algorithm can be improved, and a vibration damping characteristic and stability can be improved.

In a case where the vibration caused by the engine of an automobile is to be damped, in particular, the rotational frequency of the engine is greatly changed by the operation of an accelerator, and the frequency of the vibration varies sharply as the rotational frequency is changed, thus making vibration damping control difficult. However, the present embodiment corrects the recognized frequency, and is thus effective in that even sharp variations in the frequency of the vibration can be followed.

In addition, in the present embodiment, the frequency correcting means 35 corrects the frequency recognized by the frequency recognizing means 31 using the step S of a certain value as an amount of correction not exceeding the upper limit correction amount per correction which correction amount is set in advance when there is a phase difference $\Delta\phi$ identified by the phase difference identifying means 34. Thus, the frequency is corrected a plurality of divided times in small steps, though depending on the situation, and it is possible to prevent the control from becoming unstable as a result of the frequency being changed sharply by performing the correction with a large amount of correction exceeding the upper limit correction amount per correction, and improve the vibration damping characteristic without impairing the stability of the vibration damping control.

Further, in the first embodiment, the frequency correcting means 35 corrects the frequency recognized by the frequency recognizing means 31 when the amount of shift of the phase difference $\Delta\phi$ identified by the phase difference identifying means 34 is larger than the threshold value set in advance, and does not correct the recognized frequency when the amount of shift of the phase difference $\Delta\phi$ is equal to or smaller than the threshold value. Thus, a dead zone is provided in which the frequency is not corrected when there is a slight phase difference $\Delta\phi$, that is, when the frequencies of both vibrations coincide with each other to a certain degree. Therefore, an operation can be omitted, and frequency correction producing only a limited effect can be prevented from being performed.

In addition, in the first embodiment, the above-described vibration damping device is provided to a vehicle such as an automobile or the like, so that a comfortable ride can be provided to occupants of the vehicle.

While the first embodiment has been described above with reference to drawings, concrete configurations are not to be considered to be limited to the embodiment. The scope of the present disclosure is illustrated by not only the description of the above-described embodiment but also claims, and further includes all changes within a spirit and a scope equivalent to those of the claims.

For example, because the sine wave component $\alpha$ varies sharply, the sine wave component $\alpha$ may be subjected to an LPF (low-pass filter) to remove a pulsating component, and the frequency correction amount calculating section 68 may calculate the frequency correction amount $\Delta f$ on the basis of the sine wave component $\alpha$ after being passed through the LPF. Such a configuration can contribute to the realization of stable frequency correction.

In addition, in the first embodiment, the frequency correcting means 35 determines the step S of a certain value as an upper limit correction amount per correction as an amount of correction irrespective of the amount of shift of the phase difference $\Delta\phi$, and performs correction by adding the amount of correction. However, an amount of correction corresponding to the amount of shift of the phase difference $\Delta\phi$ may be determined, and the correction may be performed by using this amount of correction. Such a configuration can reduce the number of frequency corrections and correct the frequency quickly and properly by increasing the amount of frequency correction in a case of a large amount of shift of the phase difference $\Delta\phi$ and decreasing the amount of frequency correction in a case of a small amount of shift of the phase difference $\Delta\phi$.

Figure 8:
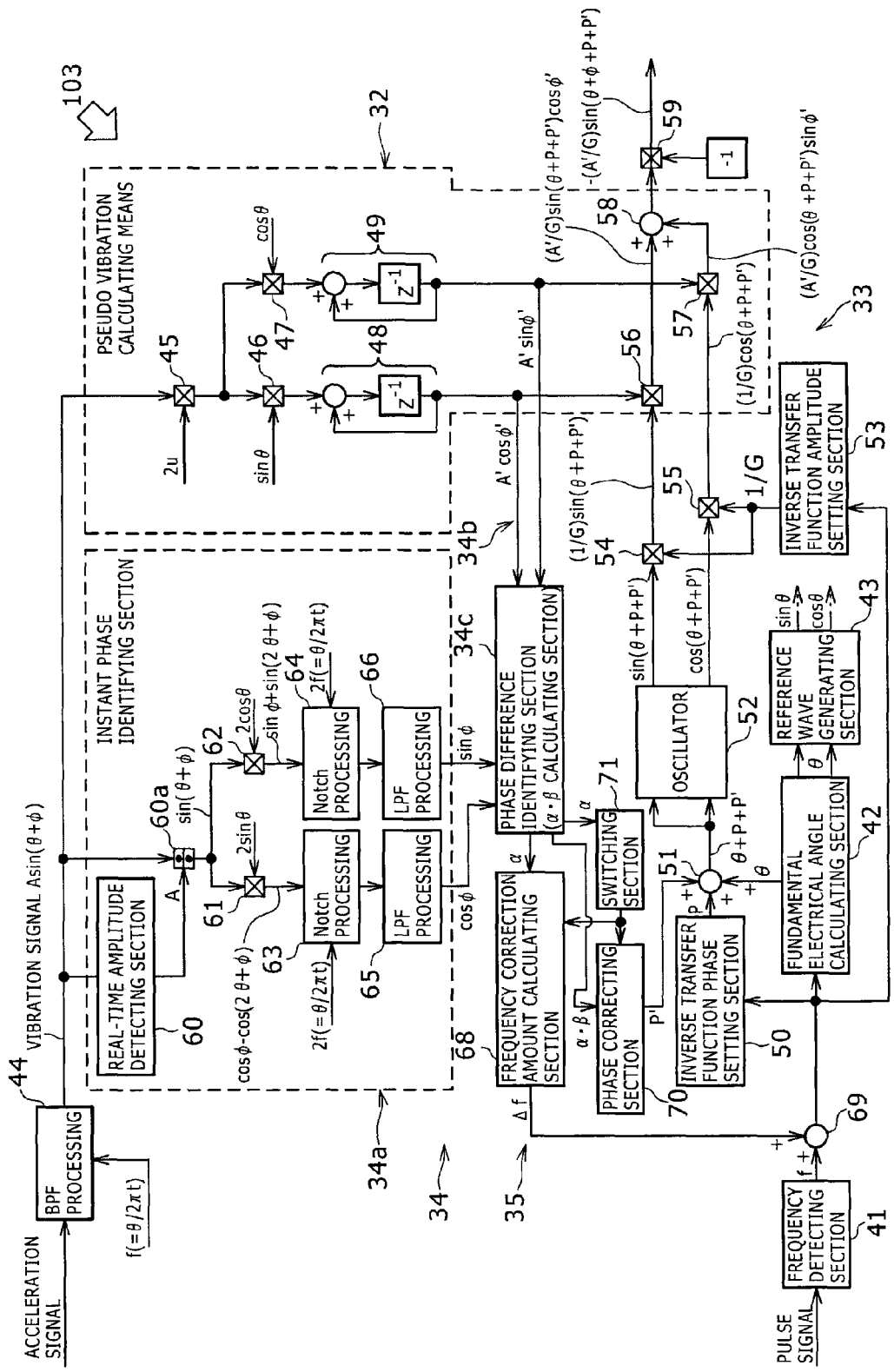
FIG. 8 is a detailed block diagram of a configuration of control means according to another embodiment than the first embodiment.

The phase component P of the inverse transfer function stored in the inverse transfer function phase setting section 50 in advance may become different from the phase component of an actual inverse transfer function due to a secular change or the like, and this disagreement may be detected as the phase difference $\Delta\phi$ by the phase difference identifying section 34c. Accordingly, as shown in FIG. 8, to correct the disagreement, a phase correcting section 70 for correcting the phase of the canceling vibration Vi4 generated at the position pos to be damped on the basis of the pseudo vibration Vi3' may be added. The phase correcting section 70 calculates an amount of phase correction P' on the basis of the sine wave component $\alpha$ and the cosine wave component $\beta$ identified by the phase difference identifying section 34c, and outputs the amount of phase correction P' to the adder 51 to correct the phase difference $\Delta\phi$. Such a configuration can provide a desired vibration damping effect even when the vibration transmission characteristic of an object to be damped such as the vehicle body frame form or the like changes due to a secular change, a temperature change, and the like.

Furthermore, as shown in FIG. 8, it is desirable that a switching section 71 for referring to the sine wave component $\alpha$ identified by the phase difference identifying section 34c and switching between the phase correction by the phase correcting section 70 and the frequency correction by the frequency correction amount calculating section 68 be further provided to determine which of the frequency correction and the phase correction is appropriate on the basis of the phase difference $\Delta\phi$ in the configuration to which the above phase correcting section 70 is added. Utilizing a fact that the sine wave component $\alpha$ changes with a certain amount of change when the phase component of the inverse transfer function is not shifted but the frequency is shifted, and that the sine wave component α does not change when the frequency is not shifted but the phase component of the inverse transfer function is shifted, the switching section 71 differentiates the sine wave component α input to the switching section 71, grasps an amount of change, and switches to the frequency correction by the frequency correction amount calculating section 68 when the sine wave component α changes and switches to the phase correction by the phase correcting section 70 when the sine wave component α does not change. Such a configuration can achieve appropriate correcting functions, and thus improve a vibration damping effect.

In addition, the concrete configurations of the parts are not limited to only the above-described embodiment, but are susceptible of various modifications without departing from the spirit of the present disclosure.

<Second Embodiment>

A vibration damping device according to a second embodiment will be described with reference to FIGS. 9 to 13. The second embodiment corresponds to a second disclosure. Incidentally, same drawings as drawings of the foregoing first embodiment (specifically FIG. 5) will be cited.

Figure 9:
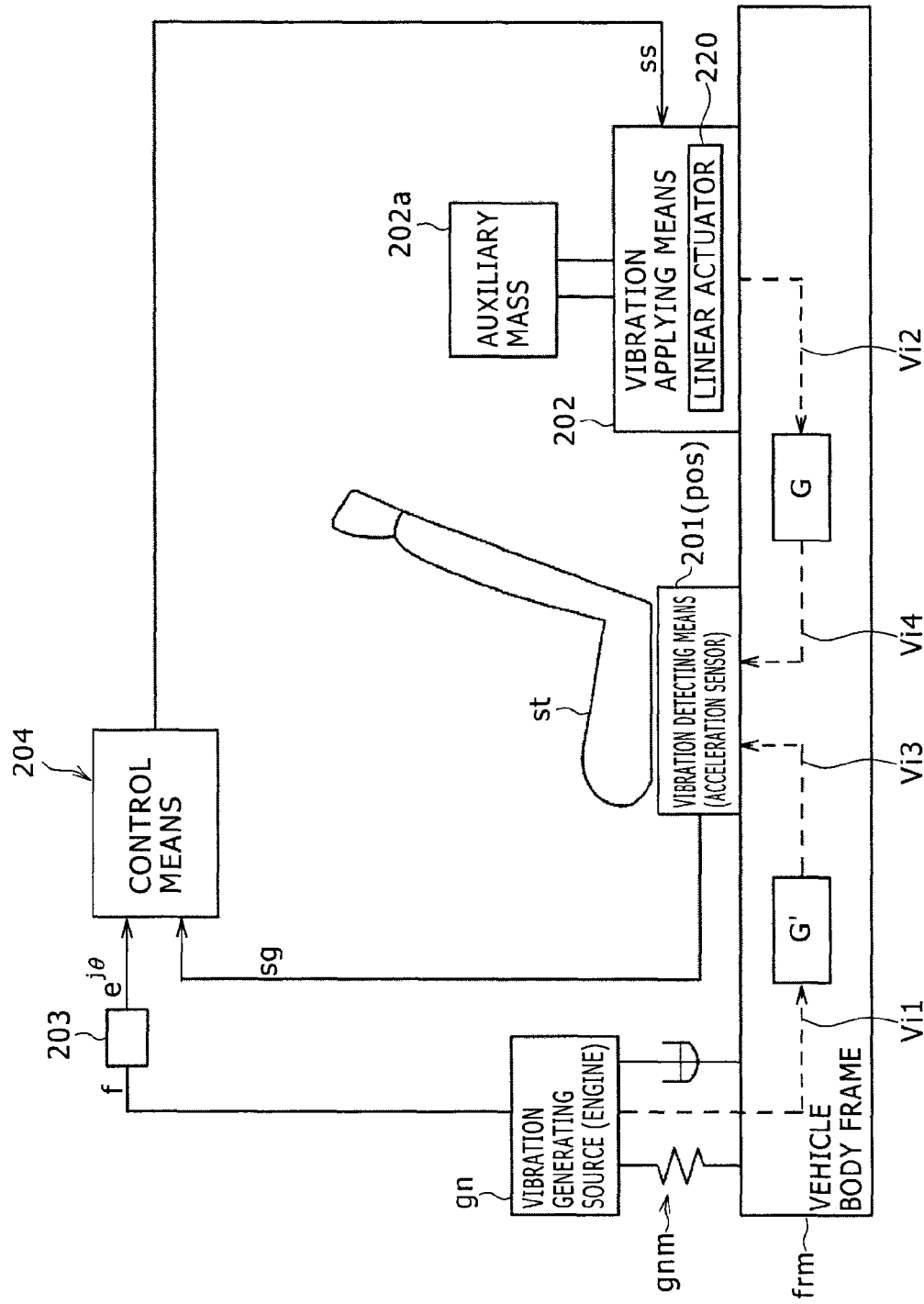
FIG. 9 is a schematic configuration diagram of a vibration damping device according to a second embodiment which vibration damping device is applied to a vehicle.

As shown in FIG. 9, the vibration damping device according to the present embodiment is mounted in a vehicle such as an automobile or the like. The vibration damping device includes: vibration detecting means 201 such as an acceleration sensor or the like disposed at a position pos to be damped such as a seat st or the like; vibration applying means 202 using a linear actuator 220 for generating a canceling vibration Vi4 at the position pos to be damped by vibrating an auxiliary mass 202a having a predetermined mass; reference wave generating means 203 for generating a reference wave $e^{j\theta}$ from a fundamental frequency f extracted from an ignition pulse of an engine as a vibration generating source gn; and adaptive control means 204 for receiving a vibration detection signal sg from the vibration detecting means 201 and the above reference wave $e^{j\theta}$, and making the vibration applying means 202 generate the canceling vibration Vi4 at the position pos to be damped. The vibration damping device reduces vibration at the position pos to be damped by making a vibration Vi3 caused by the vibration generating source gn such as the engine or the like mounted on a vehicle body frame form via a mounter gnm and the canceling vibration Vi4 generated through the vibration applying means 202 cancel each other out at the position pos to be damped.

The vibration detecting means 201 detects a main vibration in a same direction as a direction of main vibration of the engine using the acceleration sensor or the like, and outputs a vibration detection signal sg $\{=A_1 \sin(\theta+\phi)\}$.

Figure 10:
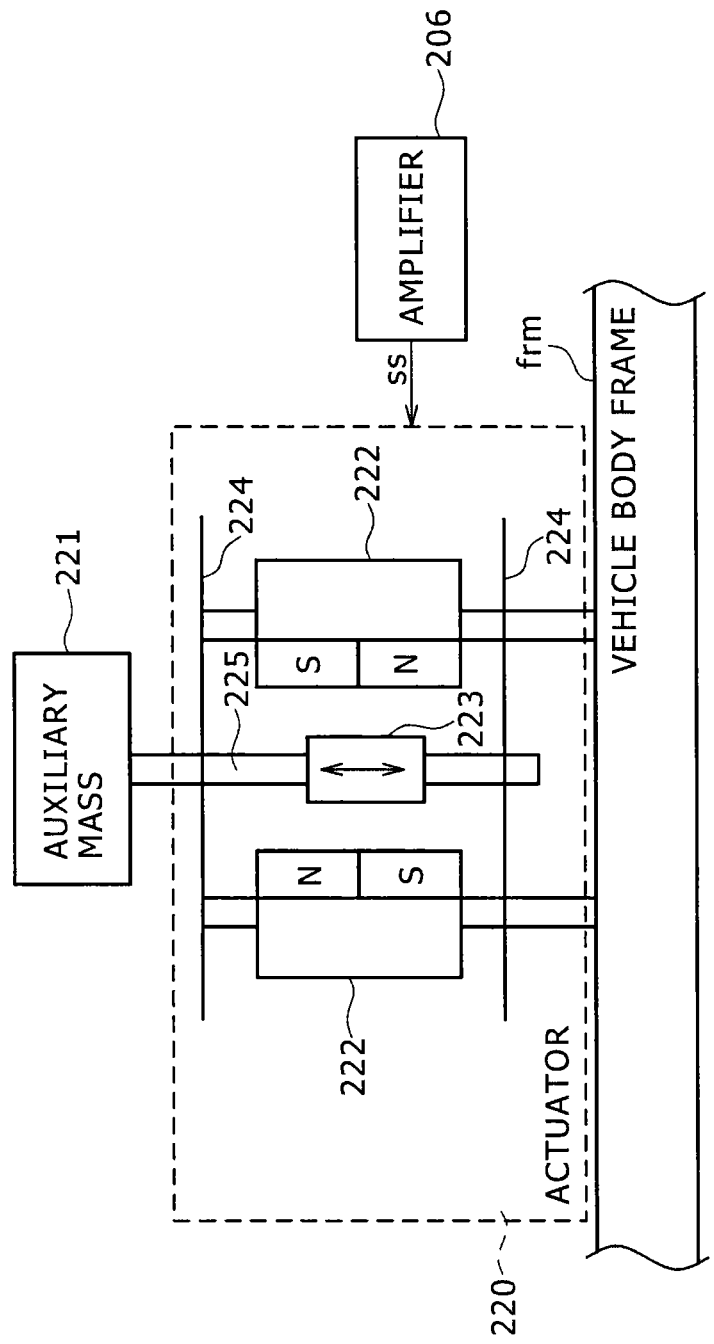
FIG. 10 is a schematic configuration diagram of vibration applying means including a linear actuator forming the same vibration damping device.

As shown in FIG. 10, the linear actuator 220 is of a reciprocating type in which a stator 222 having a permanent magnet is fixed to the vehicle body frame form, and a movable element 223 is made to perform reciprocating movement (vertical movement in the sheet of FIG. 10) in the same direction as the direction of the vibration to be suppressed. In this case, the linear actuator 220 is fixed to the vehicle body frame form such that the direction of the vibration of the vehicle body frame form which vibration is to be suppressed coincides with the direction of the reciprocating movement (thrust direction) of the movable element 223. The movable element 223 is attached to a shaft 225 together with an auxiliary mass 221. The shaft 225 is supported by the stator 222 via plate springs 224 so as to be able to move the movable element 223 and the auxiliary mass 221 in the thrust direction. The linear actuator 220 and the auxiliary mass 221 form a dynamic vibration absorber.

When an alternating current (a sinusoidal current or a square-wave current) is fed through a coil (not shown) forming the linear actuator 220, a magnetic flux in a state of the current in a predetermined direction flowing through the coil is led from the south pole to the north pole of the permanent magnet, whereby a magnetic flux loop is formed. As a result, the movable element 223 moves in a direction against gravity (upward direction). On the other hand, when a current in an opposite direction from the predetermined direction is fed through the coil, the movable element 223 moves in a direction of gravity (downward direction). The movable element 223 repeats the above operation as a result of the direction of flow of the current to the coil changing alternately due to the alternating current, and thus performs the reciprocating movement in the axial direction of the shaft 225 with respect to the stator 222. The auxiliary mass 221 joined to the shaft 225 vibrates in the vertical direction. More concrete descriptions of the structure and operation of the linear actuator 220 itself are publicly known, and therefore details thereof will be omitted. The operating range of the movable element 223 is regulated by a stopper not shown in the figure. The dynamic vibration absorber formed by the linear actuator 220 and the auxiliary mass 221 controls the acceleration of the auxiliary mass 221 and thereby adjusts a vibration damping force on the basis of a current control signal ss output from an amplifier 206. The dynamic vibration absorber can thus reduce the vibration generated in the vehicle body frame form by canceling the vibration.

Figure 11:
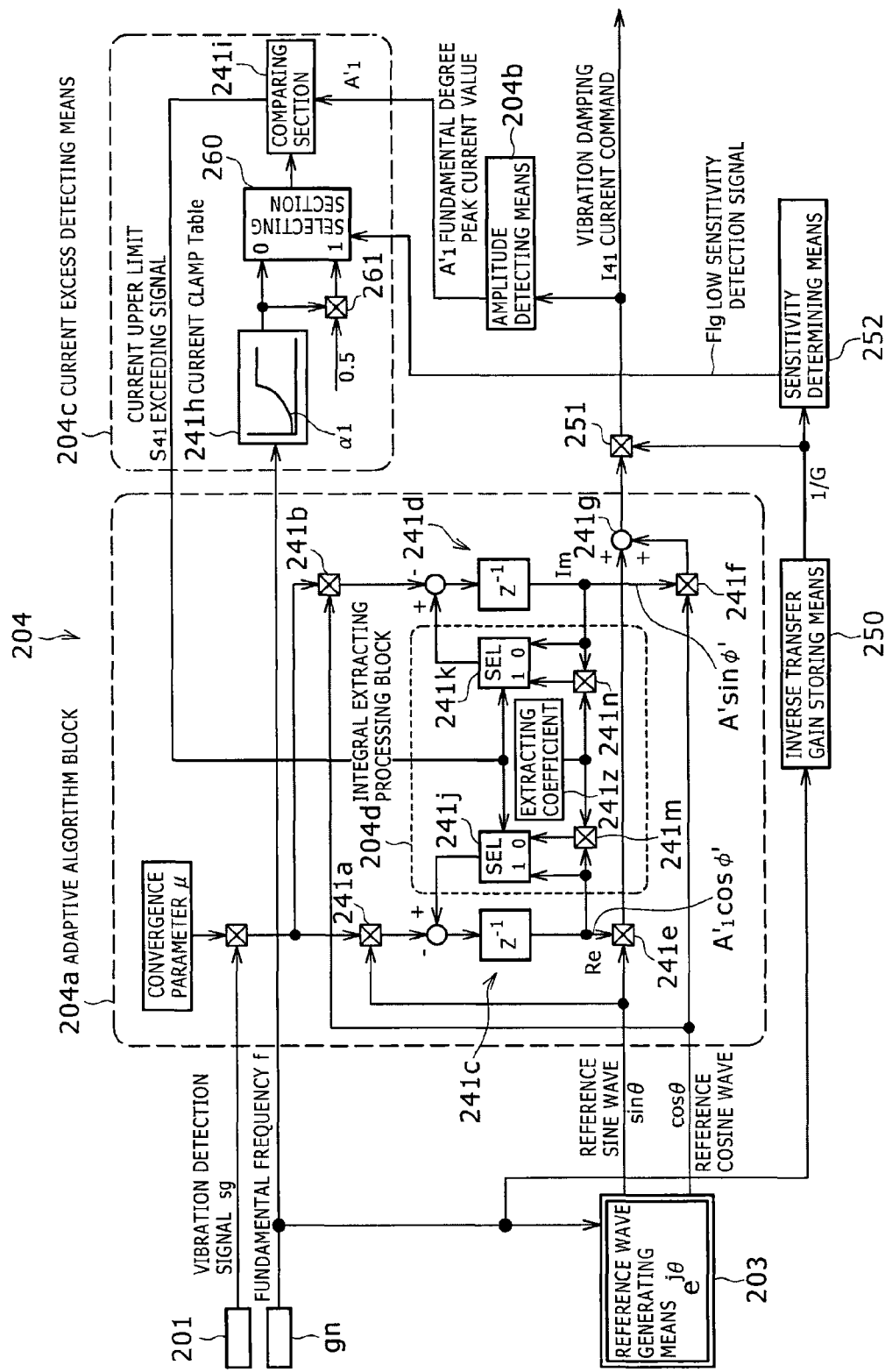
FIG. 11 is a block diagram showing a configuration relating to vibration damping control in the same embodiment.

As shown in FIG. 11, the reference wave generating means 203 generates a reference sine wave (sin θ) and a reference cosine wave (cos θ) as a reference wave $e^{j\theta}$ of a fundamental degree from a fundamental frequency f [Hz]. The generated reference sine wave (sin θ) and the generated reference cosine wave (cos θ) either may be synchronized with some synchronizing signal or may not be synchronized. θ=ωt=2πft.

The adaptive control means 204 is composed mainly of an adaptive algorithm block 204a as adaptive control means for controlling the vibration. This adaptive algorithm block 204a calculates an adaptive filter coefficient (Re, Im)=($A_1'$ cos φ', $A_1'$ sin φ') from a vibration detection signal sg and the above reference wave $e^{j\theta}$ {=(sin θ, cos θ)}, generates a vibration damping current command $I_{41}$ on the basis of the adaptive filter coefficient (Re, Im), and inputs a current control signal ss to the linear actuator 220 via a current PI operation block 205 and the amplifier 206 to be described later on the basis of the vibration damping current command $I_{41}$. A canceling vibration Vi4 in opposite phase to the vibration from the above vibration generating source gn is generated at the position pos to be damped through the vibration applying means 202. First, an inverse signal of (signal of an opposite sign to) a sine wave of a fundamental frequency component of the detected vibration detection signal sg $\{=A_1 \sin(\theta+\phi)\}$ is generated. The vibration detection signal $A_1 \sin(\theta+\phi)$ is multiplied by a convergence parameter μ, thereafter multiplied by the reference sine wave sin θ or the reference cosine wave cos θ in a multiplier 241a or 241b, and then integrated in integrators 241c and 241d in such a manner as to be added to a previous value $Z^{-1}$ in each operation. A result of the operation is calculated as a vector of an opposite phase sine wave having a component in a direction of convergence of the opposite phase sine wave vector shifted from the reference sine wave sin θ of the vibration detection signal sg, that is, the adaptive filter coefficient (Re, Im)=($A_1'$ cos φ', $A_1'$ sin φ'). The calculated adaptive filter coefficient (Re, Im) is multiplied by the reference sine wave sin θ and the reference cosine wave cos θ in multipliers 241e and 241f, respectively. Results of the multiplication are added together in an adder 241g. The vibration damping current command $I_{41}$ $\{=A_1' \sin(\theta+\phi')\}$ is thereby generated as the opposite phase sine wave signal of the vibration detection signal sg. This vibration damping current command $I_{41}$ is a canceling signal serving as a basis for the current control signal ss for making the vibration applying means 202 generate the canceling vibration Vi4 to cancel the vibration Vi3 transmitted from the vibration generating source gn to the position pos to be damped. When the integration is repeated, the cancellation of the vibration progresses as A' and φ' converge to values corresponding to true values A and φ. However, because the fundamental frequency f and the phase θ change constantly, control is performed in such a manner as to follow the changes at all times.

In generating the vibration damping current command $I_{41}$, as shown in FIG. 5, it suffices to apply, as a canceling vibration, a vibration −Vi3 obtained by inverting the waveform of the vibration Vi3 to the vibration Vi3 transmitted from the vibration generating source gn to the position pos to be damped. However, the vibration Vi2 generated by the vibration applying means 202 is changed in amplitude or phase in a process of being transmitted to the position pos to be damped due to transmission characteristics on a vibration transmission path from the vibration applying means 202 to the position pos to be damped. It is thus necessary to generate the vibration damping current command $I_{41}$ for making the vibration applying means 202 generate the vibration Vi2 such that the canceling vibration Vi4 is applied to the position pos to be damped in consideration of this change. Specifically, an inverse transfer function (1/G) of a vibration transfer function G indicating the transmission characteristics on the vibration transmission path is stored in advance as sensitivity information in association with frequency by inverse transfer gain storing means 250 shown in FIG. 11, and the vibration damping current command $I_{41}$ to generate the vibration Vi2 is generated by multiplying the opposite phase sine wave signal (=canceling vibration Vi4) of the vibration detection signal sg, the opposite phase sine wave signal being obtained as described above, by the inverse transfer function (1/G) in a multiplier 251. Incidentally, a schematic representation and description of the phase component of the inverse transfer function are herein omitted. In FIG. 5, the amplitude component of the transfer function is denoted by G, the phase component of the transfer function is denoted by P, and a vibration transfer function that changes the amplitude or phase of the vibration transmitted from the vibration generating source gn to the position pos to be damped is denoted by G'.

A transfer function gain (amplitude component) and an inverse transfer function gain (amplitude component) indicating the transmission characteristics on the vibration transmission path from the vibration applying means 202 to the position pos to be damped change in degree of transfer according to the frequency, as shown in FIGS. 12(a) and 12(b), respectively, and are stored by the inverse transfer gain storing means 250 in association with the frequency. In the example shown in FIGS. 12(a) and 12(b), a low-frequency band and a high-frequency band include a low sensitivity region in which the vibration Vi2 is not easily transmitted because the vibration Vi2 generated by the vibration applying means is greatly attenuated before being transmitted to the position to be damped depending on a position where the vibration applying means 202 is disposed and an environment such as a medium transmitting the vibration and the like. In this low sensitivity region, a vibration damping effect obtained by vibration application by the vibration applying means 202 is lessened, the canceling vibration Vi4 generated by the vibration applying means 202 is decreased, and a cancellation error between the canceling vibration Vi4 and the vibration Vi3 at the position pos to be damped is not eliminated at all. The vibration damping device therefore attempts to continue increasing the vibration Vi2 generated by the vibration applying means 202, that is, the vibration damping current command $I_{41}$. This state is not desirable from a viewpoint of stability of vibration damping, and the vibration damping current command $I_{41}$ needs to be limited.

Accordingly, the second embodiment further includes sensitivity determining means 252 for determining whether a present frequency is in the low sensitivity region in which the vibration Vi2 generated by the vibration applying means 202 is not easily transmitted on the basis of the sensitivity information stored by the inverse transfer gain storing means 250. As shown in FIG. 11 and FIG. 12(b), the sensitivity determining means 252 determines that the present frequency is in the low sensitivity region when the inverse transfer function gain (1/G) is a lower degree of transfer than a first threshold value, and outputs a low sensitivity detection signal Flg. On the other hand, when the inverse transfer function gain (1/G) is a higher degree of transfer than a second threshold value, the sensitivity determining means 252 determines that the present frequency is not in the low sensitivity region, and stops outputting the low sensitivity detection signal Flg. The second threshold value is set at a higher degree of transfer than the first threshold value. A predetermined interval is provided between the first threshold value and the second threshold value, so that a non-changing region in which a result of determination is not changed is provided between the first threshold value and the second threshold value. As an example of concrete settings of the respective threshold values, the first threshold value is desirably set equal to or less than minus several tens [dB] of a maximum value of the transfer function gain (peak value of the degree of transfer), and the second threshold value is desirably set at a value higher by a few [dB] than the first threshold value. Thus imparting a hysteresis characteristic by using the threshold values can prevent chattering in which the result of determination changes frequently and the low sensitivity detection signal Flg is repeatedly turned on/off.

When the low sensitivity detection signal Flg is output, that is, when the present frequency is in the low sensitivity region, the vibration damping current command $I_{41}$ as a canceling signal is corrected (limited) in a direction of suppressing the canceling vibration Vi4 generated by the vibration applying means 202. This correction (limitation) is performed by using a mechanism for suppressing the vibration damping current command $I_{41}$ which mechanism is provided to prevent the occurrence of a problem such for example as the collision of the movable element 223 forming the linear actuator 220 with the stopper or the like not shown in the figure, which stopper or the like is provided to the stator 222, due to an overcurrent.

Specifically, as shown in FIG. 11, the mechanism includes: amplitude detecting means 204b for calculating the peak current value $A_1'$ of the vibration damping current command $I_{41}$; and current excess detecting means 204c for deriving a current upper limit value $\alpha_1$ set in advance from the fundamental frequency f, and generating a current upper limit exceeding signal $S_{41}$ when the peak current value $A_1'$ of the vibration damping current command $I_{41}$ exceeds the current upper limit value $\alpha_1$.

The amplitude detecting means 204b is a block for calculating the amplitude $A_1'$ of the vibration damping current command $I_{41}$ at all times (in real time). The amplitude $A_1'$ may be obtained from the waveform $A_1' \sin(\theta+\phi')$ of the generated vibration damping current command $I_{41}$, or a square root of sum of squares of addition data before the generation of the waveform may be obtained. In addition, to reduce an amount of operation, only the sum of the squares may be obtained, and the current upper limit value $\alpha_1$ to be compared may be squared.

The current excess detecting means 204c stores the current upper limit value $\alpha_1$ in a form of a current clamp table 241h. A smaller value of a motor upper limit current Ic (maximum output value) and a position upper limit current Ip (collision prevention) shown in FIG. 13(a) is adopted as the upper limit value $\alpha_1$.

The motor upper limit current Ic is a smaller value of a maximum current value that can be output by a controller realizing an operation processing function according to the present embodiment and a maximum current value that can be fed to the linear actuator 220 (at such a level as not to demagnetize the magnet). The motor upper limit current Ic is constant irrespective of the frequency.

On the other hand, the position upper limit current Ip is an upper limit value of a current at which the movable element 223 operated by feeding a sinusoidal current does not exceed an amplitude upper limit allowing the movable element 223 to be movable. Letting a be sine wave acceleration, and Ap be a maximum acceleration $(=a\sqrt{2})$, an allowable amplitude Lp of a current command Iref shown in FIG. 13(b) is $Lp<|Xmax|=Ap/\omega^2$. This current command Iref is calculated by a current PI operation block 205, and input to the amplifier 206 as a voltage command, so that the linear actuator 220 is driven with the acceleration a by the driving of the amplifier 206. As shown in FIG. 13(c), supposing that a transfer gain from the current command Iref to the occurrence of the acceleration a in the movable element 223 is E(f), there is a relation $a(f)=Iref \cdot E(f) \ldots (1)$. Supposing that a maximum acceleration Ap(f) is obtained when a maximum current Ip(f) is given, $Ap(f)=E(f) \cdot Ip(f) \ldots (2)$. From Equations (1) and (2), $Ip(f)=\omega^2|Xmax|/E(f)$ is obtained. This Ip(f) is set as the position upper limit current. The position upper limit current Ip(f) at any given time is determined by inputting the fundamental frequency f extracted from the engine gn.

The current upper limit value $\alpha_1$ (smaller of Ic and Ip) is input to a selecting section 260 as it is, while a current upper limit value $(\alpha_1/2)$ obtained by branching the current upper limit value $\alpha_1$ and limiting the current upper limit value $\alpha_1$ to one half by a multiplier 261 is input to the selecting section 260. The selecting section 260 outputs the current upper limit value $\alpha_1$ when the low sensitivity detection signal Flg is not output by the sensitivity determining means 252. On the other hand, the selecting section 260 outputs the limited current upper limit value $(\alpha_1/2)$ when the low sensitivity detection signal Flg is output by the sensitivity determining means 252. The output current upper limit value (one of $\alpha_1$ and $\alpha_1/2$) and the peak current value $A_1'$ output by the amplitude detecting means 204b are input to a comparing section 241i. The comparing section 241i determines whether the fundamental degree peak current value $A_1'$ is equal to or higher than the current upper limit value (one of $\alpha_1$ and $\alpha_1/2$) at the frequency. When the peak current value $A_1'$ exceeds the current upper limit value, the comparing section 241i outputs a current upper limit exceeding signal (ON signal) $S_{41}$. When the peak current value $A_1'$ does not exceed the current upper limit value, the comparing section 241i does not output the current upper limit exceeding signal $S_{41}$ (OFF signal). This signal $S_{41}$ may be turned on/off purely according to whether the peak current value $A_1'$ exceeds the current upper limit value, or some hysteresis characteristics may be imparted.

The output current upper limit exceeding signal $S_{41}$ is input to the adaptive algorithm block 204a. While the current upper limit exceeding signal $S_{41}$ is input to the adaptive algorithm block 204a, that is, while the present frequency is in the low sensitivity region, the adaptive filter coefficient (Re, Im) is corrected in a direction of limiting the vibration damping current command $I_{41}$ within a predetermined range each time the adaptive filter coefficient (Re, Im) is calculated.

As described above, the adaptive algorithm block 204a repeats the process of updating the adaptive filter coefficient (Re, Im) while integrating the input signal sg input from the vibration detecting means 201. In limiting the vibration damping current command $I_{41}$, an integral extracting processing block 204d is provided at a position to narrow down the integral value described above to a small value so that integral extracting processing is performed. Specifically, the adaptive algorithm block 204a sets a flag of 0 or 1 in internal flag setting sections 241j and 241k according to whether the current upper limit exceeding signal $S_{41}$ is input or not. The adaptive algorithm block 204a does not narrow down the integral value when the signal $S_{41}$ is not input (at a time of the flag 1). When the signal $S_{41}$ is input (at a time of the flag 0), the adaptive algorithm block 204a narrows down the integral value to a small value by multiplying the previous value $Z^{-1}$ by an extracting coefficient value k set in an extracting coefficient setting section 241z in multipliers 241m and 241n in each operation timing. The extracting coefficient value k is to reduce an amount by which the integral value is narrowed down in one operation, and is set at $k=1020/1024$ ($=0.9961$), for example. The extracting coefficient value k is not well below one (the amount of narrowing down of the integral value is held small) because the extracting coefficient value k too much smaller than one sharply changes the value of the vibration damping current command $I_{41}$ in one narrowing-down operation, and a harmonic is superimposed on the output, causing the excitation of abnormal vibration. This extracting coefficient value k may be made variable in the extracting coefficient setting section 241z according to the deviation signal from the comparing section 241i such that the extracting coefficient value k is decreased as an amount of excess over the current upper limit value $\alpha_1$ (current clamp value) becomes larger (that is, such that the amount of narrowing down of the integral value is increased). In addition, the ratio of the amount of excess may be calculated, and the extracting coefficient value k may be synchronized with the current upper limit value $\alpha_1$.

That is, when the vibration damping current command $I_{41}$ exceeds, a correction that limits the vibration damping current command $I_{41}$ in a predetermined range (range of narrowing down the integral according to the extracting coefficient value k in this case) is repeated, instead of immediately cutting off the amount of excess of the vibration damping current command $I_{41}$. The vibration damping current command $I_{41}$ therefore gradually approaches an amplitude that does not cause a harmonic or collision of the movable element. The narrowing-down coefficient generating block 204d is a mere example, and may have an internal configuration in any form as long as the block switches on or off the application of the narrowing-down coefficient value k or increases or decreases the narrowing-down coefficient value k on the basis of the current upper limit exceeding signal $S_{41}$. The adaptive filter coefficient (Re, Im) converges faster as the convergence parameter μ is increased.

As described above, in canceling out the vibration Vi3 caused by the vibration generating source gn and the canceling vibration Vi4 generated by the vibration applying means 202 at the position pos to be damped, the vibration damping device according to the present embodiment includes: the adaptive algorithm block 204a as control means for receiving the frequency f corresponding to the vibration Vi3 and generating the vibration damping current command $I_{41}$ as a canceling signal for canceling the vibration Vi3 transmitted from the vibration generating source gn to the position pos to be damped; the vibration applying means 202 for generating the canceling vibration Vi4 at the position pos to be damped, the vibration applying means 202 being actuated by being supplied with the vibration damping current command $I_{41}$ as the canceling signal generated by the adaptive algorithm block 204a as control means; and the vibration detecting means 201 for detecting the vibration remaining as a cancellation error between the vibration Vi3 caused by the vibration generating source gn and the canceling vibration Vi4 at the position pos to be damped. The adaptive algorithm block 204a as control means corrects the vibration damping current command $I_{41}$ as the canceling signal so as to reduce the vibration remaining as the cancellation error on the basis of the vibration detected by the vibration detecting means 201. The vibration damping device further includes: the inverse transfer gain storing means 250 as storing means for storing the transmission characteristics on the vibration transmission path from the vibration applying means 202 to the position pos to be damped as sensitivity information in association with frequency; and the sensitivity determining means 252 for determining on the basis of the sensitivity information whether the present frequency is in a low sensitivity region in which the vibration generated by the vibration applying means 202 is not easily transmitted. When the sensitivity determining means 252 determines that the present frequency is in the low sensitivity region, the adaptive algorithm block 204a as control means corrects the vibration damping current command $I_{41}$ as the canceling signal in a direction of suppressing the canceling vibration generated by the vibration applying means.

With such a configuration, the transmission characteristics on the vibration transmission path from the vibration applying means 202 to the position pos to be damped are stored as sensitivity information in association with frequency, and when it is determined on the basis of the sensitivity information that the present frequency is in the low sensitivity region in which the vibration Vi2 generated by the vibration applying means 202 is not easily transmitted, the vibration damping current command $I_{41}$ as the canceling signal is corrected in a direction of suppressing the canceling vibration Vi4 generated by the vibration applying means 202. Thus, in the low sensitivity region in which a vibration damping effect obtained by vibration application by the vibration applying means 202 is lessened, the vibration generated by the vibration applying means 2 is suppressed. It is therefore possible to prevent an adverse effect from being produced on the vibration of other parts and prevent the canceling vibration Vi4 larger than necessary from being applied when the present frequency comes out of the low sensitivity region, solve problems caused by the low sensitivity region, and improve vibration damping stability.

In addition, in the present embodiment, the sensitivity determining means 252 determines on the basis of the sensitivity information that the present frequency is in the low sensitivity region when the degree of transfer of the amplitude component as one of the transmission characteristics on the vibration transmission path which transmission characteristic is associated with the present frequency is lower than the predetermined first threshold value. It is therefore possible to determine effectively whether the present frequency is in the low sensitivity region according to the setting of the first threshold value.

Further, in the present embodiment, the sensitivity determining means 252 determines on the basis of the sensitivity information that the present frequency is not in the low sensitivity region when the degree of transfer of the amplitude component as one of the transmission characteristics on the vibration transmission path which transmission characteristic is associated with the present frequency is higher than the second threshold value as a degree of transfer higher than the first threshold value, and the non-changing region in which a result of determination is not changed is provided between the first threshold value and the second threshold value. The adaptive algorithm block 204a as control means does not correct the vibration damping current command I41 as the canceling signal when the sensitivity determining means 252 determines that the present frequency is not in the low sensitivity region. It is therefore possible to avoid frequent changes in the determination result and consequently unstable control when the present frequency is in the vicinity of the threshold values.

Furthermore, in the present embodiment, the canceling signal is the vibration damping current command $I_{41}$, and the vibration damping device further includes the current excess detecting means 204c for deriving the predetermined current upper limit value $\alpha_1$ from the frequency, and inputting the current upper limit exceeding signal $S_{41}$ to the adaptive algorithm block 204a as control means when the peak current value $A_1'$ of the vibration damping current command $I_{41}$ exceeds the current upper limit value $\alpha_1$. The adaptive algorithm block 204a as control means receives the input current upper limit exceeding signal $S_{41}$ and limits the vibration damping current command $I_{41}$. The current excess detecting means 204c corrects the current upper limit value $\alpha_1$ in a direction of limiting the vibration damping current command $I_{41}$ and changes the current upper limit value $\alpha_1$ to the current upper limit value ($\alpha_1/2$) when the sensitivity determining means 252 determines that the present frequency is in the low sensitivity region. Thus, utilizing the mechanism for preventing a problem such as the collision of the movable element 223 or the like which problem is caused by the flowing of a very large vibration damping current command, it is possible to correct the vibration damping current command $I_{41}$ in a direction of suppressing the canceling vibration Vi4 generated by the vibration applying means 202 when the present frequency is in the low sensitivity region.

Thus, when such a vibration damping device is mounted in a vehicle, reliability and durability related to the vibration damping function of the vehicle can be improved effectively, and excellent running functions can be achieved.

While one embodiment of the present disclosure has been described above, the concrete configurations of the respective parts are not limited to only the foregoing embodiment. For example, in the present embodiment, the inverse transfer function gain is recorded in association with the frequency, and the sensitivity determining means 252 determines on the basis of the inverse transfer function gain whether the present frequency is in the low sensitivity region. However, the transfer function gain may be stored in association with the frequency in place of the inverse transfer function gain, and the above determination may be made on the basis of the transfer function gain.

In addition, various modifications can be made without departing from the spirit of the present disclosure, for example by applying the present disclosure to moving devices and apparatuses and the like other than vehicles in which the occurrence of vibration becomes a problem.

<Third Embodiment>

A vibration damping device according to a third embodiment will be described in the following with reference to FIGS. 14 to 16. The third embodiment corresponds to a third disclosure. Incidentally, same drawings as drawings of the foregoing first embodiment (specifically FIG. 1, FIG. 5, and FIG. 6) will be cited.

As shown in FIG. 1, the vibration damping device according to the third embodiment is mounted in a vehicle such as an automobile or the like. The vibration damping device includes: vibration detecting means 1 such as an acceleration sensor or the like disposed at a position pos to be damped such as a seat st or the like; vibration applying means 2 using a linear actuator for generating a vibration Vi2 by vibrating an auxiliary mass 2a having a predetermined mass; and control means 3 for receiving an ignition pulse signal of an engine as a vibration generating source gn and a detection signal from the vibration detecting means 1, and making a canceling vibration Vi4 generated at the position pos to be damped by transmitting the vibration Vi2 generated by the vibration applying means 2 to the position pos to be damped. The vibration damping device reduces vibration at the position pos to be damped by making a vibration Vi1 caused by the vibration generating source gn such as the engine or the like mounted on a vehicle body frame form via a mounter gnm and the canceling vibration Vi4 generated at the position pos to be damped through the vibration applying means 2 cancel each other out at the position pos to be damped.

Figure 14:
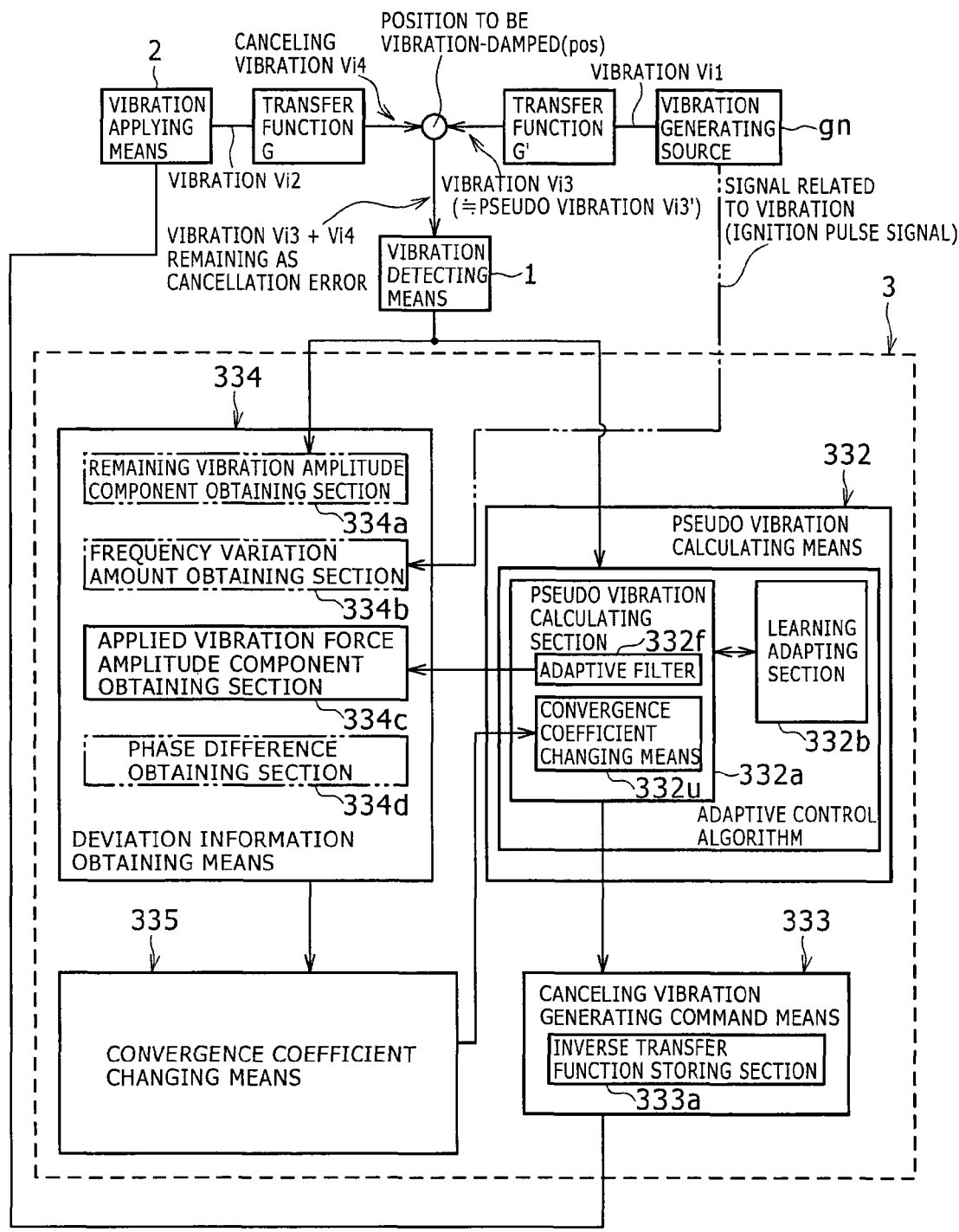
FIG. 14 is a schematic block diagram of a configuration and functions of control means according to a third embodiment.

As shown in FIG. 14, in order to generate, at the position pos to be damped, the canceling vibration Vi4 for accurately canceling the vibration Vi3 transmitted from the vibration generating source gn to the position pos to be damped, the control means 3 calculates a pseudo vibration Vi3' simulating the vibration Vi3 transmitted from the vibration generating source gn to the position pos to be damped by using an adaptive filter 332$f$ of an adaptive algorithm. The control means 3 makes the canceling vibration Vi4 generated at the position pos to be damped through the vibration applying means 2 on the basis of the calculated pseudo vibration Vi3'. In addition, the control means 3 performs vibration damping control that detects a vibration (Vi3+Vi4) remaining as a cancellation error between the canceling vibration Vi4 transmitted from the vibration applying means 2 to the position pos to be damped and the vibration Vi3 by the vibration detecting means 1, and which vibration damping control repeats the calculation of the adaptive filter 332$f$ so as to reduce the detected vibration (Vi3+Vi4) remaining as the cancellation error and which converges the pseudo vibration Vi3' and the adaptive filter 332$f$ to true values by accumulation of calculations. The pseudo vibration necessary to cancel the vibration Vi3 transmitted from the vibration generating source gn to the position pos to be damped in the present embodiment is the pseudo vibration Vi3' simulating the vibration Vi3, but may also be a pseudo vibration directly simulating the canceling vibration Vi4 transmitted from the vibration applying means 2 to the position pos to be damped without the vibration Vi3 being simulated.

As shown in FIG. 14, the control means 3 for performing the vibration damping control by this adaptive control includes pseudo vibration calculating means 332 and canceling vibration generating command means 333.

The pseudo vibration calculating means 332 calculates the pseudo vibration Vi3' using the adaptive filter 332$f$, and successively updates the adaptive filter 332$f$ so as to reduce the vibration (Vi3+Vi4) remaining as the cancellation error input from the vibration detecting means 1. Specifically, the pseudo vibration calculating means 332 includes a pseudo vibration calculating section 332a and a learning adapting section 332b. The pseudo vibration calculating section 332a subjects reference waves serving as a basis for the calculation of the pseudo vibration Vi3' to filtering using the adaptive filter 332$f$, and thereby changes the amplitude and phase of the reference waves and calculates the pseudo vibration Vi3'. The learning adapting section 332b repeats the calculation of the adaptive filter toward true values of the adaptive filter from the reference waves as the basis for the calculation of the adaptive filter 332$f$ so as to eliminate the vibration (Vi3+Vi4) remaining as the cancellation error input from the vibration detecting means 1. The learning adapting section 332b makes the pseudo vibration Vi3' and the adaptive filter 332$f$ converge to the true values by accumulation of such calculations. In calculating the adaptive filter 332$f$, a convergence coefficient 332u indicating a degree by which the adaptive filter 332$f$ is brought closer to the true values per calculation is used, and the convergence coefficient 332u determines a rate at which the adaptive filter 332$f$ converges to the true values.

The canceling vibration generating command means 333 makes the canceling vibration Vi4 generated at the position pos to be damped through the vibration applying means 2 on the basis of the pseudo vibration Vi3' calculated by the pseudo vibration calculating means 332. In generating the canceling vibration, as shown in FIG. 5, it suffices to apply a vibration −Vi3 obtained by inverting the waveform of the vibration Vi3 to the vibration Vi3 transmitted from the vibration generating source gn to the position pos to be damped. However, the vibration Vi2 generated by the vibration applying means 2 is changed in amplitude or phase in a process of being transmitted to the position pos to be damped. It is thus necessary for the vibration applying means 2 to generate the vibration Vi2 such that the canceling vibration Vi4 is applied to the position pos to be damped in consideration of this change. Specifically, an inverse transfer function of a vibration transfer function G that changes the amplitude and phase of the vibration transmitted from the vibration applying means 2 to the position pos to be damped is stored in an inverse transfer function storing section 333a in advance, and the vibration Vi2 is calculated by incorporating the inverse transfer function into the canceling vibration Vi4 obtained by inversing the waveform of the pseudo vibration Vi3' simulating the vibration Vi3 at the position pos to be damped. In this case, the amplitude component of the inverse transfer function is stored as 1/G in the inverse transfer function storing section 333a, and the phase component of the inverse transfer function is stored as P in the inverse transfer function storing section 333a. Incidentally, a vibration transfer function that changes the amplitude or phase of the vibration transmitted from the vibration generating source gn to the position pos to be damped is denoted by G'.

As shown in FIG. 14, in addition to the above configuration, the present embodiment further includes deviation information obtaining means 334 and convergence coefficient changing means 335.

The deviation information obtaining means 334 obtains deviation information corresponding to a deviation between the vibration Vi3 transmitted from the vibration generating source gn to the position pos to be damped and the canceling vibration Vi4 generated at the position pos to be damped on the basis of the pseudo vibration Vi3'.

The convergence coefficient changing means 335 changes the convergence coefficient so as to increase the rate at which the adaptive filter 332$f$ converges as an applied vibration force amplitude component obtained by the deviation information obtaining means 334 is increased.

A concrete control block for realizing such control means 3 will be described with reference to FIG. 15.

Figure 15:
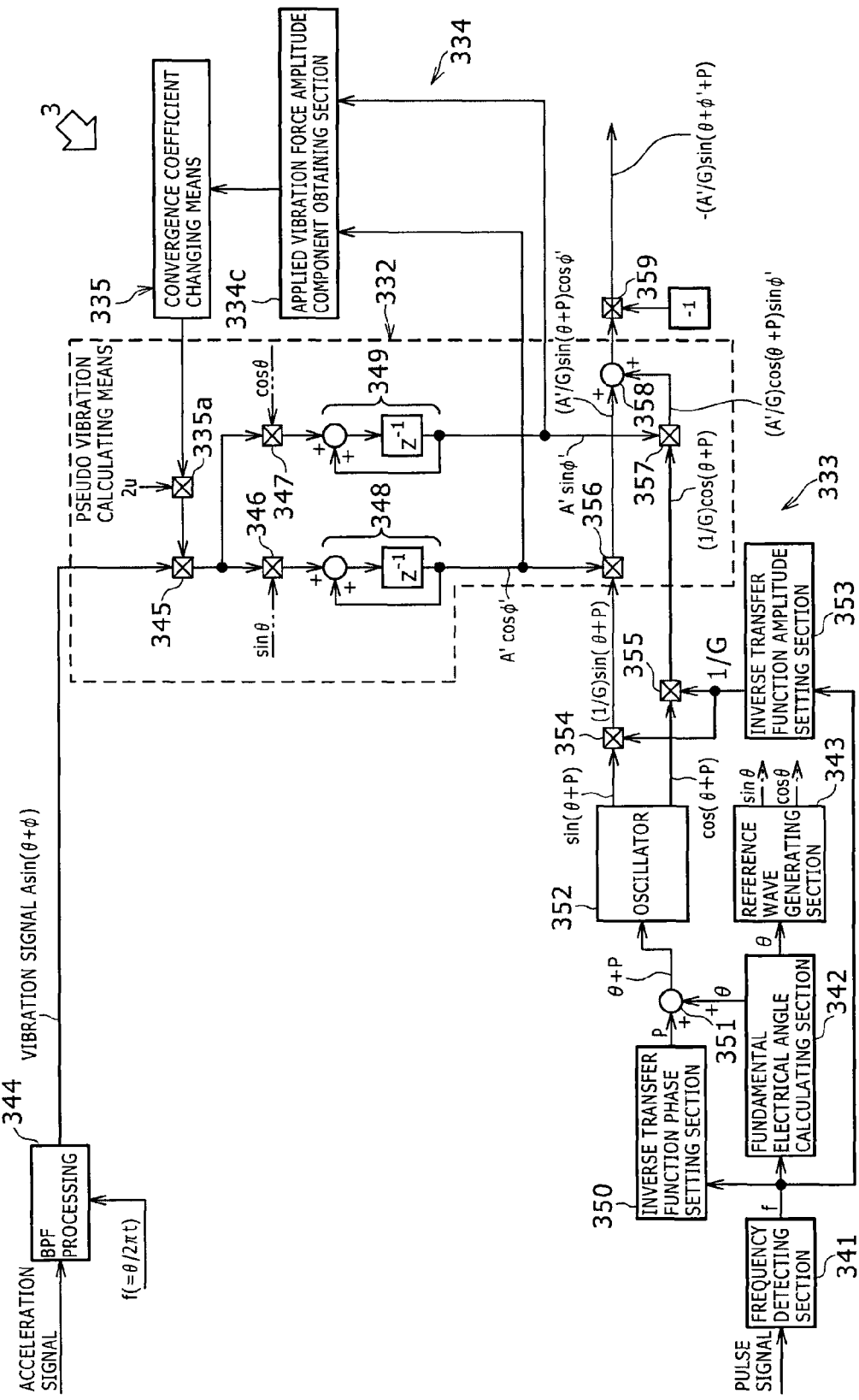
FIG. 15 is a block diagram showing details of a configuration of the control means according to the same embodiment.
Figure 16:
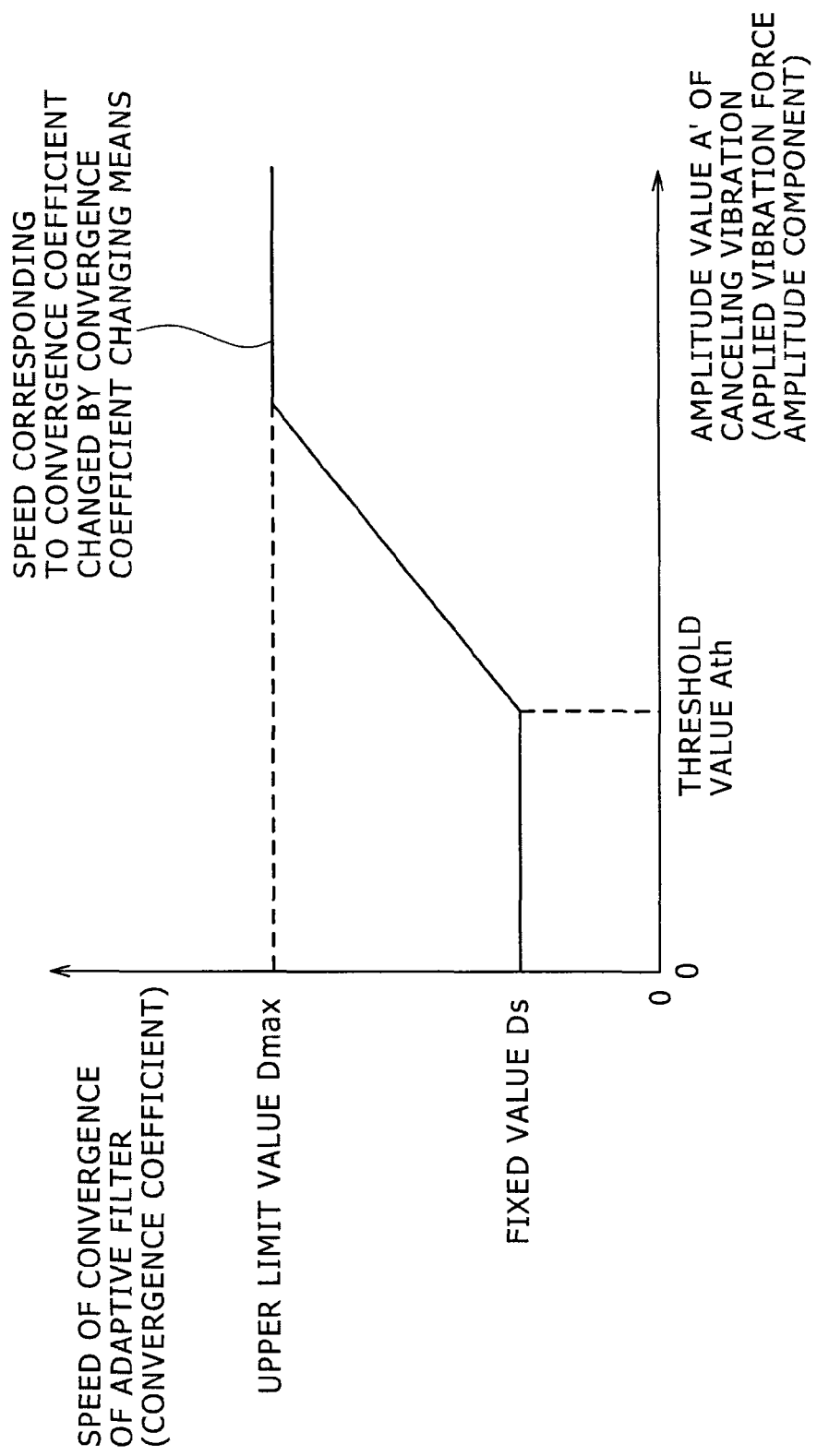
FIG. 16 is a diagram showing a relation between the amplitude value of a canceling vibration and a convergence coefficient changed according to the amplitude value.

As shown in FIG. 15, a frequency detecting section 341 is supplied with an engine pulse signal indicating the ignition timing of the engine as the vibration generating source gn, treats the frequency of the input engine pulse signal as coinciding with the frequency f of the vibration Vi3 at the position pos to be damped, and recognizes the frequency f of the vibration Vi3. Of course, another signal such for example as a detection pulse signal from a sensor for detecting the rotational frequency of an engine crank may be used in place of the ignition pulse signal of the engine. A fundamental electrical angle calculating section 342 is supplied with the recognized frequency f and calculates a fundamental electrical angle θ (=ωt). A reference wave generating section 343 generates a reference sine wave sin θ and a reference cosine wave cos θ as reference waves on the basis of the calculated fundamental electrical angle θ. These reference waves serve as a reference for the amplitude and phase of waveforms in signal processing in the control means 3 and the like.

The vibration at the position pos to be damped which vibration is detected by the vibration detecting means 1 as an acceleration sensor includes other vibrations than the vibration caused by the vibration generating source gn. Therefore, only the vibration caused by the vibration generating source gn is detected as a vibration signal by subjecting the output signal of the vibration detecting means 1 to a BPF (band-pass filter) 344 for extracting only a signal of a component of the frequency f recognized by the frequency detecting section 341.

In order to simulate the vibration signal, suppose that the vibration signal is A sin(θ+φ) where θ=ωt, and the following equations are used.

First, the vibration signal A sin(θ+φ) multiplied by 2 sin θ can be transformed as follows:

$$2A\sin(\theta+\phi)\times\sin\theta = A\cos\phi - A\cos(2\theta+\phi)$$

When this equation is integrated using a convergence coefficient μ, the integral of a second term A cos(2θ+φ) on a right side is (μA/2ω)sin(2θ+φ). When μ is set to a very small value as compared with A, (μA/2ω)sin(2θ+φ) can be ignored because (μA/2ω)sin(2θ+φ) has a small amplitude and is the integral of a periodic function, and the right side as a whole converges to A' cos φ' having an amplitude component of a value A' close to a true value A and a phase component of a value φ' close to a true value φ.

Similarly, the vibration signal A sin(θ+φ) multiplied by 2 cos θ can be transformed as follows:

$$2A\sin(\theta+\phi)\times\cos\theta = A\sin\phi + A\sin(2\theta+\phi)$$

When this equation is integrated using the convergence coefficient θ, the integral of a second term A sin(2θ+φ) on a right side is the integral of a periodic function and can therefore be ignored, as in the above, and the right side as a whole converges to A' sin φ' having the amplitude component of the value A' close to the true value A and the phase component of the value φ' close to the true value φ.

An addition of A' cos φ' multiplied by sin θ and A' sin φ' multiplied by cos θ, A' cos φ' and A' sin φ' being obtained as described above, can be transformed as follows:

$$\sin\theta\times A'\cos\phi' + \cos\theta\times A'\sin\phi' = A'\sin\theta\cos\phi' + A'\cos\theta\sin\phi' = A'\sin(\theta+\phi')$$

Thus, the pseudo vibration A' sin(θ+φ') simulating the vibration signal A sin(θ+φ) can be calculated by performing the above operation on the vibration signal. A' cos φ' and A' sin φ' are a so-called adaptive filter 332f in adaptive control, which adaptive filter adapts itself to converge the amplitude A' and phase φ' of the pseudo vibration to the amplitude A and the phase φ as true values according to the input of the vibration signal. In addition, the adaptive filter is transformed to the pseudo vibration by multiplying the adaptive filter by the reference waves and adding together results of the multiplication. The adaptive filter can therefore be said to express an amplitude difference and a phase difference between the pseudo vibration and the reference waves.

The pseudo vibration calculating means 332 is configured as shown in FIG. 15 to calculate the pseudo vibration using the above operation processing while updating the adaptive filter 332f by learning on the basis of the vibration signal A sin(θ+φ). Specifically, a multiplier 345 multiplies the vibration signal A sin(θ+φ) by a convergence coefficient based on 2μ. Multipliers 346 and 347 respectively multiply a result of the multiplication in the multiplier 345 by the reference sine wave sin θ and the reference cosine wave cos θ output from the reference wave generating section 343, and output the results to integrators 348 and 349. The integrators 348 and 349 integrate the outputs from the multipliers 346 and 347, and output A' cos φ' and A' sin φ' as the adaptive filter 32f indicating the amplitude difference and the phase difference between the pseudo vibration and the reference waves.

The pseudo vibration A' sin(θ+φ') is obtained by multiplying the adaptive filter 332f by the reference sine wave sin θ and the reference cosine wave θ and thereafter adding together results of the multiplication as described above. However, in the present embodiment, the reference waves incorporating the inverse transfer function of the amplitude component and the phase component are generated before being multiplied by the adaptive filter 332f. Of course, the inverse transfer function of the amplitude component and the phase component may be incorporated after the pseudo vibration is calculated. Specifically, in the present embodiment, an inverse transfer function amplitude setting section 353 stores the amplitude component of the inverse transfer function corresponding to the frequency in advance. The inverse transfer function amplitude setting section 353 is supplied with the recognized frequency f, and identifies the amplitude component 1/G of the inverse transfer function. Similarly, an inverse transfer function phase setting section 350 stores the phase component of the inverse transfer function corresponding to the frequency in advance. The inverse transfer function phase setting section 350 is supplied with the recognized frequency f, and identifies the phase component P of the inverse transfer function. The identified phase component P and the fundamental electrical angle θ are added together by an adder 351 and then input to an oscillator 352. The oscillator 352 generates a sine wave sin(θ+P) and a cosine wave cos(θ+P) incorporating the phase component P of the inverse transfer function. Multipliers 354 and 355 respectively multiply the generated sine wave sin(θ+P) and the generated cosine wave cos(θ+P) by the amplitude component 1/G of the inverse transfer function which amplitude component is identified by the inverse transfer function amplitude setting section 353. The multipliers 354 and 355 thereby generate reference waves incorporating the inverse transfer function of the amplitude and the phase.

Multipliers 356 and 357 respectively multiply the reference waves (1/G)sin(θ+P) and (1/G)cos(θ+P) generated by the multipliers 354 and 355 and incorporating the inverse transfer function of the amplitude and the phase by A' cos φ' and A' sin φ as the above-described adaptive filter 332f. When results of the multiplication at the multipliers 356 and 357 are added together by an adder 358, and a result of the addition is multiplied by −1 by a multiplier 359, a canceling signal as a command to generate a canceling vibration [−(A'/G)sin(θ+φ'+P)] is generated, and the canceling vibration [−(A'/G)sin(θ+φ'+P)] is applied by the vibration applying means 2.

In addition to the configuration for performing the vibration damping control using the above adaptive control, the control means 3 further includes an applied vibration force amplitude component obtaining section 334c forming the deviation information obtaining means 334 and the convergence coefficient changing means 335.

Directing attention to a fact that the higher the amplitude value of the canceling vibration Vi4, the larger the vibration (Vi3+Vi4) remaining as a cancellation error when the vibration caused by the vibration generating source gn changes, and the deviation between the vibration Vi3 transmitted from the vibration generating source gn to the position pos to be damped and the canceling vibration Vi4 generated at the position pos to be damped on the basis of the pseudo vibration Vi3' is correspondingly increased, the applied vibration force amplitude component obtaining section 334c forming the deviation information obtaining means 334 obtains an applied vibration force amplitude component corresponding to the amplitude value of the canceling vibration Vi4 as an index of the above deviation. Concrete examples of the applied vibration force amplitude component include for example the amplitude component of the adaptive filter 332f which amplitude component serves as a basis for the amplitude value of the canceling vibration Vi4 and the amplitude component of the pseudo vibration Vi3' calculated by the pseudo vibration calculating means 332. In the present embodiment, specifically, the applied vibration force amplitude component obtaining section 334c is supplied with A' cos φ' and A' sin φ' as the adaptive filter 332f output by the integrators 348 and 349, and obtains the amplitude component A' of the adaptive filter 332f as the applied vibration force amplitude component on the basis of the input adaptive filter 332f.

The convergence coefficient changing means 335 changes the convergence coefficient 332u according to the amplitude component A' of the adaptive filter 332f as the applied vibration force amplitude component obtained by the deviation information obtaining means 334. The changing of the convergence coefficient 332u is performed by changing the basic value 2μ serving as a basis by outputting a gain to a multiplier 335a. As shown in FIG. 16, the convergence coefficient changing means 335 outputs the gain such that the convergence speed of the adaptive filter 332f is a fixed value Ds when the amplitude component A' of the adaptive filter 332f as the applied vibration force amplitude component is equal to or lower than a threshold value Ath set in advance. The convergence coefficient changing means 335 outputs the gain such that the convergence speed linearly increases when the amplitude component A' exceeds the threshold value Ath. The convergence coefficient changing means 335 outputs the gain such that the convergence speed is an upper limit value Dmax set in advance irrespective of increases in the amplitude component A' when the convergence speed has reached the upper limit value Dmax. The upper limit value Dmax is provided to prevent the adaptive filter 332f from diverging when the convergence speed determined by the convergence coefficient 332u is faster than a certain upper limit. The convergence coefficient changing means 335 changes the convergence coefficient 332u so as to increase the speed of convergence of the adaptive filter 332f as the applied vibration force amplitude component is increased as described above, and changes the convergence coefficient 332u so as to decrease the speed of convergence of the adaptive filter 332f as the applied vibration force amplitude component is decreased. Of course, there may be only a configuration for changing the convergence coefficient 332u so as to increase the speed of convergence of the adaptive filter 332f, or only a configuration for changing the convergence coefficient 332u so as to decrease the speed of convergence of the adaptive filter 332f.

As described above, in canceling out the vibration Vi3 caused by the vibration generating source gn and the canceling vibration Vi4 generated through the vibration applying means 2 at the position pos to be damped, the vibration damping device according to the present embodiment includes: the pseudo vibration calculating means 332 for calculating the pseudo vibration Vi3' necessary to cancel the vibration Vi3 transmitted from the vibration generating source gn to the position pos to be damped using the adaptive filter 332f; the canceling vibration generating command means 333 for making the canceling vibration Vi4 generated at the position pos to be damped through the vibration applying means 2 on the basis of the pseudo vibration Vi3' calculated by the pseudo vibration calculating means 332; and the vibration detecting means 1 for detecting the vibration (Vi3+Vi4) remaining as a cancellation error between the vibration Vi3 caused by the vibration generating source gn and the canceling vibration Vi4 at the position pos to be damped. The pseudo vibration calculating means 332 repeats the calculation of the adaptive filter 332f so as to reduce the vibration (Vi3+Vi4) remaining as the cancellation error on the basis of the vibration (Vi3+Vi4) detected by the vibration detecting means 1 and the convergence coefficient 332u for determining the speed of convergence of the adaptive filter 332f to true values, and converges the pseudo vibration Vi3' and the adaptive filter 332f to the true values by accumulation of calculations. The vibration damping device includes: the deviation information obtaining means 334 for obtaining deviation information corresponding to the deviation between the vibration Vi3 transmitted from the vibration generating source gn to the position pos to be damped and the canceling vibration Vi4 generated at the position pos to be damped on the basis of the pseudo vibration Vi3'; and the convergence coefficient changing means 335 for changing the convergence coefficient 332u so as to increase the speed of convergence of the adaptive filter 332f as the deviation is increased and so as to decrease the speed of convergence of the adaptive filter 332f as the deviation is decreased, on the basis of the deviation information obtained by the deviation information obtaining means 334.

In the present embodiment, vibration damping control is performed in which the pseudo vibration Vi3' necessary to cancel the vibration Vi3 transmitted from the vibration generating source gn to the position pos to be damped is calculated by the pseudo vibration calculating means 332 using the adaptive filter 332f, the canceling vibration Vi4 is made to be generated by the canceling vibration generating command means 333 at the position pos to be damped through the vibration applying means 2 on the basis of the calculated pseudo vibration Vi3', the vibration (Vi3+Vi4) remaining as a cancellation error between the vibration Vi3 caused by the vibration generating source gn and the canceling vibration Vi4 at the position pos to be damped is detected by the vibration detecting means 1, the adaptive filter 332f is calculated by the pseudo vibration calculating means 332 so as to reduce the vibration (Vi3+Vi4) remaining as the cancellation error on the basis of the detected vibration (Vi3+Vi4) and the convergence coefficient 332u for determining the speed of convergence of the adaptive filter 332f to true values, and the pseudo vibration Vi3' and the adaptive filter 332f are converged to the true values by accumulation of calculations. In this case, directing attention to a fact that the deviation between the vibration (Vi3+Vi4) remaining as the cancellation error and the canceling vibration Vi4 generated at the position pos to be damped on the basis of the pseudo vibration Vi3' is increased when the canceling vibration Vi4 needs to be changed greatly so as to correspond to a change in the vibration Vi3 to be damped, whereas the deviation is decreased when the canceling vibration Vi4 does not need to be changed greatly, the deviation information corresponding to the deviation is obtained by the deviation information obtaining means 334, and the convergence coefficient 332*u* is changed by the convergence coefficient changing means 335 on the basis of the obtained deviation information so as to increase the speed of convergence of the adaptive filter 332*f* as the deviation is increased and so as to decrease the speed of convergence of the adaptive filter 332*f* as the deviation is decreased. Thus, higher response is achieved by increasing the speed of convergence of the adaptive filter 332*f* when the canceling vibration Vi4 generated at the position pos to be damped needs to be changed greatly. The behavior of the canceling vibration Vi4 is reduced by decreasing the speed of convergence of the adaptive filter 332*f* when the canceling vibration Vi4 to be applied does not need to be changed greatly. Thereby the response and stability of the vibration damping control are improved. Thus, appropriate vibration damping control can be achieved even when there is a mixture of cases where the canceling vibration Vi4 needs to be changed greatly and where the canceling vibration Vi4 does not need to be changed greatly.

In particular, in the present embodiment, directing attention to a fact that the higher the amplitude value of the canceling vibration Vi4 generated at the position pos to be damped on the basis of the pseudo vibration Vi3', the larger the vibration (Vi3+Vi4) remaining as the cancellation error and the larger the deviation when a change occurs in the vibration Vi3 caused by the vibration generating source gn, the deviation information obtaining means 34 obtains the amplitude component A' of the adaptive filter 332*f* as the applied vibration force amplitude component corresponding to the amplitude value of the canceling vibration Vi4 generated at the position pos to be damped on the basis of the pseudo vibration Vi3' as deviation information corresponding to the deviation, and the convergence coefficient changing means 335 changes the convergence coefficient 332*u* so as to increase the speed of convergence of the adaptive filter 332*f* as the amplitude component A' of the adaptive filter 332*f* as the applied vibration force amplitude component obtained by the deviation information obtaining means 334 is increased and so as to decrease the speed of convergence of the adaptive filter 332*f* as the amplitude component A' of the adaptive filter 332*f* is decreased. Therefore a configuration for improving the response and stability of the vibration damping control can be realized by using the magnitude of the applied vibration force amplitude component as an index of the above deviation.

<Fourth Embodiment>

A vibration damping device according to a fourth embodiment will next be described with reference to FIG. 17. The fourth embodiment corresponds to the third disclosure.

Figure 17:
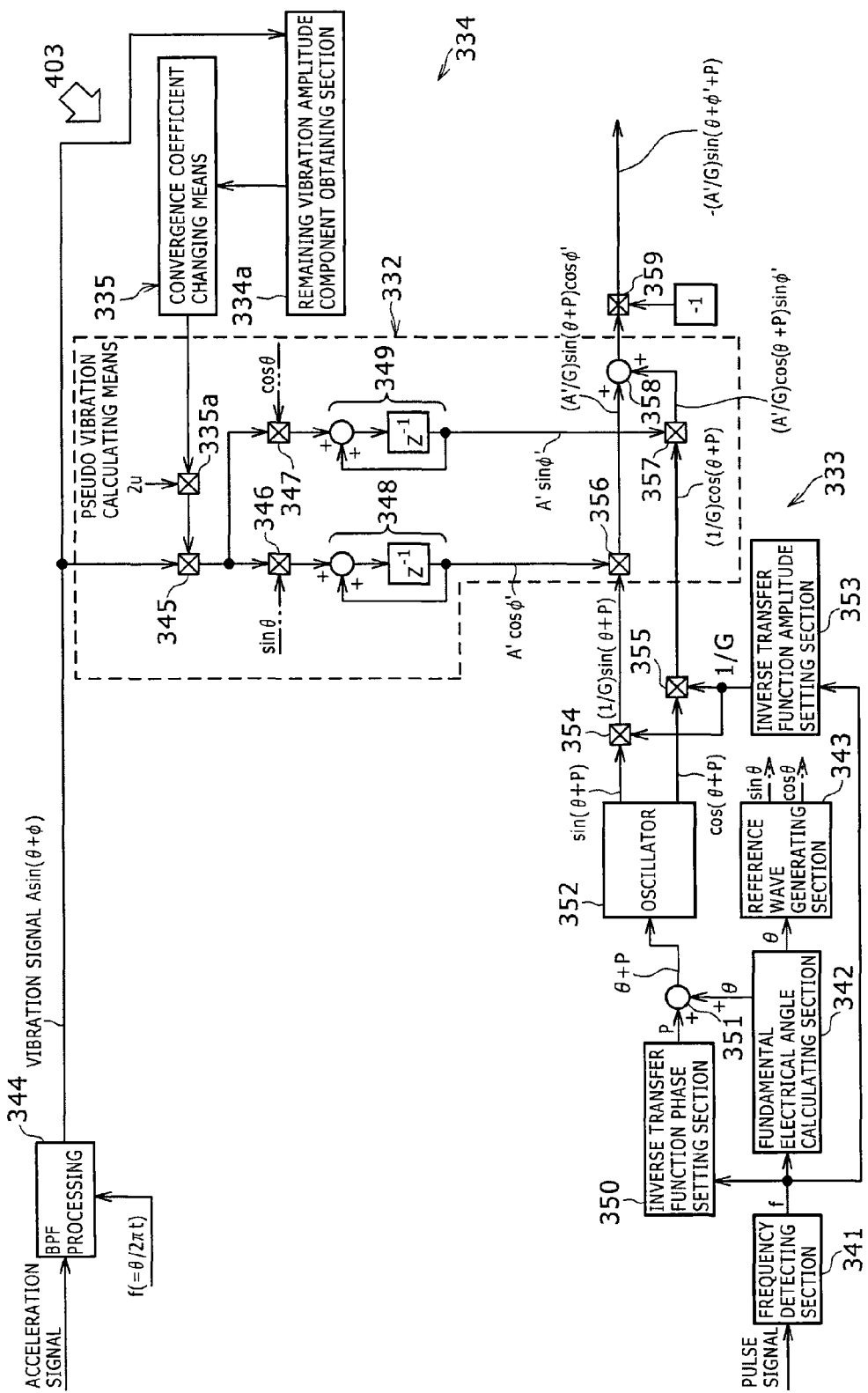
FIG. 17 is a block diagram showing details of a configuration of control means according to a fourth embodiment.

FIG. 17 is a block diagram showing a configuration and functions of control means 403 according to the present embodiment. The control means 403 has a substantially similar configuration to that of the control means 3 according to the foregoing third embodiment. However, the control means 403 has a remaining vibration amplitude component obtaining section 334*a* indicated by a phantom line in FIG. 14 in place of the applied vibration force amplitude component obtaining section 334*c* forming the deviation information obtaining means 334 shown in FIG. 14 and FIG. 15.

Directing attention to a fact that the larger the amplitude component of the vibration (Vi3+Vi4) remaining as the cancellation error, the larger the above deviation, the remaining vibration amplitude component obtaining section 334*a* obtains the amplitude component of the vibration (Vi3+Vi4) remaining as the cancellation error as an index of the above deviation. Specifically, the remaining vibration amplitude component obtaining section 334*a* is supplied with a vibration signal A sin($\theta$+$\phi$) output from a BPF (band-pass filter) 344, and obtains the amplitude component A from the input vibration signal A sin($\theta$+$\phi$).

In correspondence with the remaining vibration amplitude component obtaining section 334*a*, convergence coefficient changing means 335 is supplied with the amplitude component A obtained by the remaining vibration amplitude component obtaining section 334*a*, and changes a convergence coefficient so as to increase the speed of convergence of an adaptive filter 332*f* as the input amplitude component A is increased and so as to decrease the speed of convergence of the adaptive filter 332*f* as the input amplitude component A is decreased. Specifically, the convergence coefficient changing means 335 outputs a gain such that Amplitude Component A×Predetermined Coefficient k is a convergence coefficient 332*u*. Of course, the convergence coefficient 332*u* may be determined by other processing such as PI control (proportional-integral control) or the like that sets a target value to zero for the amplitude component A, for example, as long as the speed of convergence of the adaptive filter 332*f* is in accordance with the amplitude component.

As described above, the vibration damping device according to the present embodiment is characterized in that the remaining vibration amplitude component obtaining section 334*a* forming the deviation information obtaining means 334 obtains the amplitude component A of the vibration (Vi3+Vi4) remaining as the cancellation error detected by the vibration detecting means 1 as deviation information corresponding to the deviation, and in that the convergence coefficient changing means 335 changes the convergence coefficient 332*u* so as to increase the speed of convergence of the adaptive filter 332*f* as the amplitude component A of the vibration (Vi3+Vi4) remaining as the cancellation error, which amplitude component is obtained by the remaining vibration amplitude component obtaining section 334*a* forming the deviation information obtaining means 334, is increased, and so as to decrease the speed of convergence of the adaptive filter 332*f* as the amplitude component A is decreased.

In the present embodiment, directing attention to a fact that the larger the amplitude component A of the vibration (Vi3+Vi4) remaining as the cancellation error, the larger the deviation between the vibration Vi3 transmitted from the vibration generating source gn to the position pos to be damped and the canceling vibration Vi4 generated at the position pos to be damped on the basis of the pseudo vibration Vi3', the amplitude component A of the vibration (Vi3+Vi4) remaining as the cancellation error detected by the vibration detecting means 1 is obtained as deviation information corresponding to the deviation, and the convergence coefficient 332*u* is changed so as to increase the speed of convergence of the adaptive filter 332*f* as the obtained amplitude component A is increased and so as to decrease the speed of convergence of the adaptive filter 332*f* as the obtained amplitude component A is decreased. Thus, a configuration for improving the response and stability of vibration damping control can be realized by using the amplitude component A of the vibration remaining as the cancellation error as an index of the above deviation.

<Fifth Embodiment>

A vibration damping device according to a fifth embodiment will next be described with reference to FIG. 18. The fifth embodiment corresponds to the third disclosure.

Figure 18:
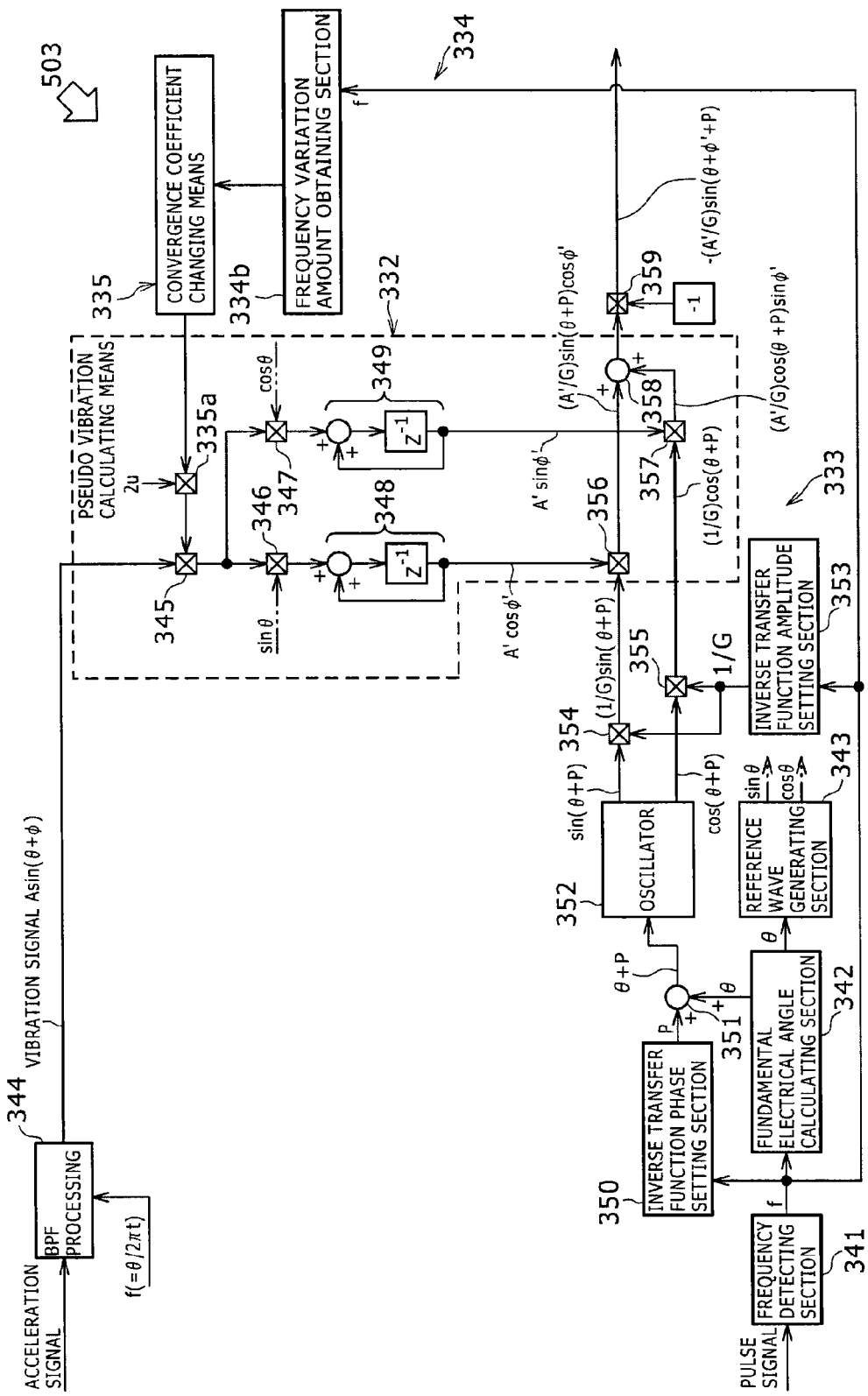
FIG. 18 is a block diagram showing details of a configuration of control means according to a fifth embodiment.

FIG. 18 is a block diagram showing a configuration and functions of control means 503 according to the present embodiment. The control means 503 has a substantially similar configuration to that of the control means 3 according to the foregoing third embodiment. However, the control means 503 has a frequency variation amount obtaining section 334b indicated by a phantom line in FIG. 14 in place of the applied vibration force amplitude component obtaining section 334c forming the deviation information obtaining means 334 shown in FIG. 14 and FIG. 15.

Directing attention to a fact that the larger the amount of variation in frequency of the vibration Vi3 at the position pos to be damped, the larger the above deviation, the frequency variation amount obtaining section 334b obtains the amount of variation in frequency of the vibration at the position pos to be damped as an index of the above deviation on the basis of a signal related to the vibration caused by the vibration generating source gn. Specifically, the frequency variation amount obtaining section 334b is supplied with a frequency f recognized by a frequency detecting section 341, and obtains the amount of variation in the frequency f by subjecting the input frequency f to differentiation processing or the like.

In correspondence with the frequency variation amount obtaining section 334b, convergence coefficient changing means 335 is supplied with the amount of variation in frequency f of the vibration Vi3, the amount of variation in frequency f of the vibration Vi3 being obtained by the frequency variation amount obtaining section 334b, and changes a convergence coefficient so as to increase the speed of convergence of an adaptive filter 332f as the input amount of variation is increased and so as to decrease the speed of convergence of the adaptive filter 332f as the input amount of variation is decreased. Specifically, the convergence coefficient changing means 335 determines a convergence coefficient 332u so as to increase the speed of convergence of the adaptive filter 332f in proportion to the amount of variation in the frequency f. Of course, for example, multiplication by a fixed gain may be performed, or a switchable configuration may be provided so as to use one of a plurality of convergence coefficients 332u set in advance according to whether the amount of variation in frequency f exceeds a predetermined threshold value, as long as the speed of convergence of the adaptive filter 332f is in accordance with the amount of variation in frequency f.

As described above, the vibration damping device according to the present embodiment is characterized in that the frequency variation amount obtaining section 334b forming the deviation information obtaining means 334 obtains the amount of variation in frequency f of the vibration Vi3 at the position pos to be damped as deviation information corresponding to the deviation on the basis of an engine pulse signal as the signal related to the vibration Vi3 caused by the vibration generating source 1, and in that the convergence coefficient changing means 335 changes the convergence coefficient 332u so as to increase the speed of convergence of the adaptive filter 332f as the amount of variation in frequency f, which amount of variation in frequency f is obtained by the frequency variation amount obtaining section 334b forming the deviation information obtaining means 334, is increased, and so as to decrease the speed of convergence of the adaptive filter 332f as the obtained amount of variation in frequency f is decreased.

In the present embodiment, directing attention to a fact that the larger the amount of variation in frequency if of the vibration Vi3 at the position pos to be -damped, the larger the deviation, the amount of variation in frequency f of the vibration Vi3 at the position pos to be damped is obtained as deviation information corresponding to the deviation on the basis of the engine pulse signal as the signal related to the vibration Vi3 caused by the vibration generating source gn, and the convergence coefficient 332u is changed so as to increase the speed of convergence of the adaptive filter 332f as the obtained amount of variation in frequency f is increased and so as to decrease the speed of convergence of the adaptive filter 332f as the obtained amount of variation in frequency f is decreased. Thus, a configuration for improving the response and stability of vibration damping control can be realized by using the amount of variation in frequency f of the vibration Vi3 at the position pos to be damped as an index of the above deviation.

<Sixth Embodiment>

A vibration damping device according to a sixth embodiment will next be described with reference to FIG. 19 and FIG. 6. The sixth embodiment corresponds to the third disclosure.

Figure 19:
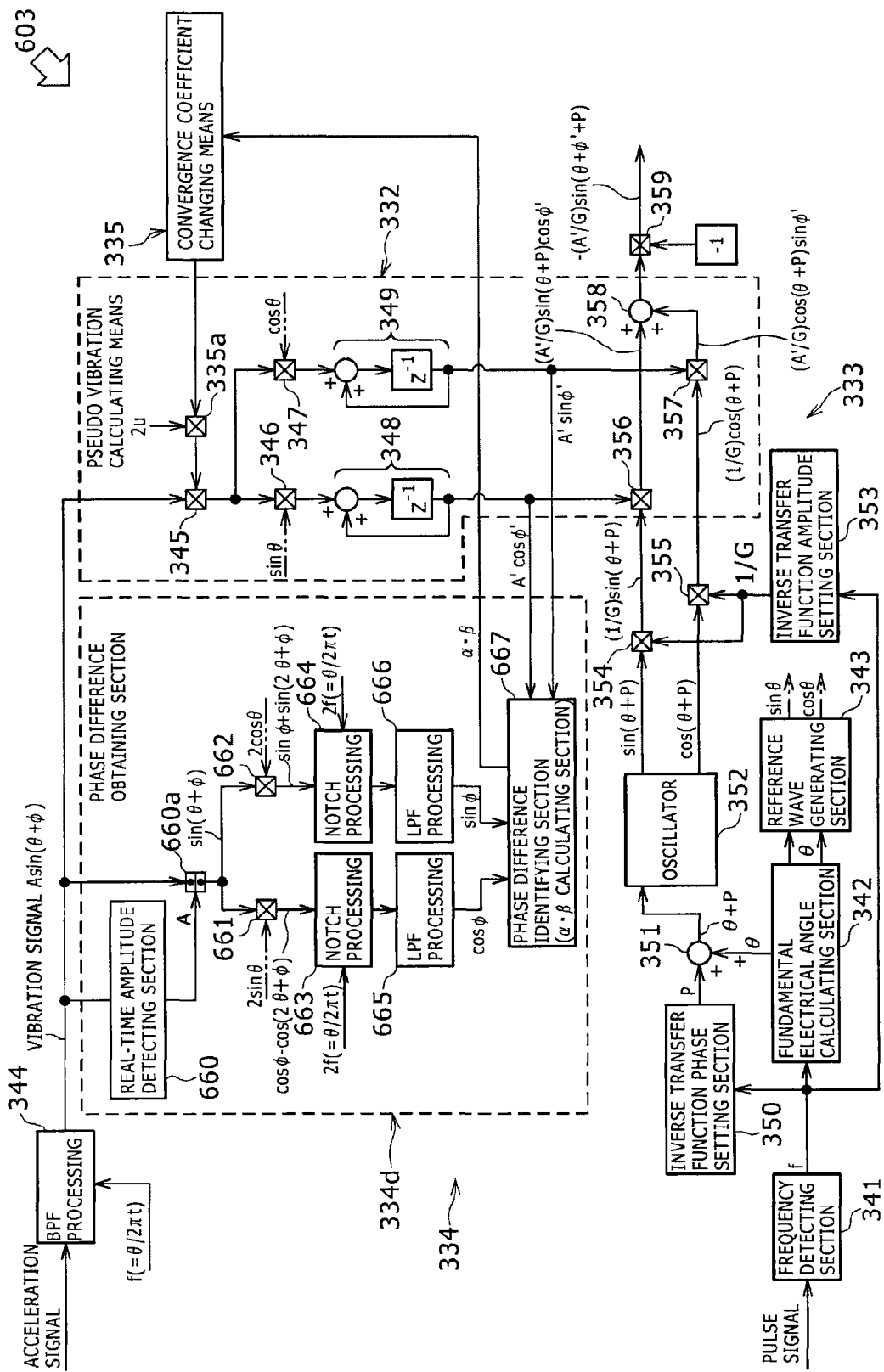
FIG. 19 is a block diagram showing details of a configuration of control means according to a sixth embodiment.

FIG. 19 is a block diagram showing a configuration and functions of control means 603 according to the present embodiment. The control means 603 has a substantially similar configuration to that of the control means 3 according to the foregoing third embodiment. However, the control means 603 has a phase difference obtaining section 334d indicated by a phantom line in FIG. 14 in place of the applied vibration force amplitude component obtaining section 334c forming the deviation information obtaining means 334 shown in FIG. 14 and FIG. 15.

As shown in FIGS. 6A to 6D, the phase difference obtaining section 334d obtains a phase difference $\Delta\phi$ $(=\phi-\phi')$ between the phase $\phi$ of a vibration (Vi3+Vi4) remaining as a cancellation error and the phase $\phi'$ of a canceling vibration Vi4 generated at the position pos to be damped on the basis of a pseudo vibration Vi3'. A configuration of the phase difference obtaining section 334d will be concretely described in the following.

As shown in FIG. 19, first, a divider 660a divides the vibration signal $A \sin(\theta+\phi)$ by the amplitude A detected by a real-time amplitude detecting section 660. Thereby $\sin(\theta+\phi)$ with an amplitude of unity is obtained.

The real-time amplitude detecting section 660 utilizes a fact that the integral value of the sine wave $\sin \theta$ with an amplitude of unity in half a cycle 0 to $\pi$ is $(-\cos \pi)-(-\cos 0)=(1)-(-1)=2$ and that an average value thereof is an average from 0 to $\pi$ and is thus $2/\pi$. The real-time amplitude detecting section 660 is supplied with the vibration signal $A \sin(\theta+\phi)$, applies absolute value processing to the vibration signal $A \sin(\theta+\phi)$, subjects the result of the absolute value processing to a notch filter for removing a twofold frequency component, removes a pulsating component by an LPF (low-pass filter), and multiplies the result by $2/\pi$. The real-time amplitude detecting section 660 thereby obtains the amplitude A instantly.

Multipliers 661 and 662 multiply $\sin(\theta+\phi)$ as a result of the division by the divider 660a by $2 \sin \theta$ and $2 \cos \theta$, respectively, and obtain $\cos \phi - \cos(2\theta+\phi)$ and $\sin \phi + \sin(2\theta+\phi)$ from the product-sum theorem. Notch processing 663 for removing a twofold frequency component is applied to $\cos \phi - \cos(2\theta+\phi)$ as a result of the operation by the multiplier 661, and a pulsating component is removed by LPF (low-pass filter) processing 665 to obtain $\cos \phi$. Similarly, notch processing 664 for removing a twofold frequency component is applied to $\sin \phi + \sin(2\theta+\phi)$ as a result of the operation by the multiplier 662, and a pulsating component is removed by LPF (low-pass filter) processing 666 to obtain $\sin \phi$. Thus $\cos \phi$ and $\sin \phi$ having the phase component of the vibration signal $A \sin(\theta+\phi)$ are instantly identified.

A phase difference identifying section 667 identifies a phase difference on the basis of cos φ and sin φ identified and A' cos φ' and A' sin φ' as an adaptive filter 332f. Specifically, the phase φ and the phase φ' indicate a phase shift with respect to the common fundamental electrical angle θ. Thus, when the phase of the pseudo vibration and the phase of the vibration at the position pos to be damped coincide with each other, φ and φ' are equal to each other. Hence, the phase difference Δφ is defined as φ−φ', and the phase difference is expressed by a sine wave component α and a cosine wave component β of the phase difference which components are calculated by using the following equations.

Sine Wave Component α=A' sin(φ−φ')=A'(sin φ cos φ'−cos φ sin φ')=sin φ(A' cos φ')−cos φ(A' sin φ')

Cosine Wave Component β=A' cos(φ−φ')=A'(cos φ cos φ'+sin φ sin φ')=cos φ(A' cos φ')+sin φ(A' sin φ')

It is known that the above-described adaptive control algorithm makes the control diverge and renders the vibration damping impossible when the phase difference Δφ goes beyond a range of ±60 degrees. It is thus possible to determine whether Δφ is advanced or delayed according to the sign of the sine wave component α under a condition that Cosine Wave Component β>0, and grasp the amount of shift of the phase difference Δφ from the magnitude of the sine wave component α.

In correspondence with the phase difference obtaining section 334d, convergence coefficient changing means 335 is supplied with the sine wave component α and the cosine wave component β indicating the phase difference Δφ obtained by the phase difference obtaining section 334d, and changes a convergence coefficient so as to change the speed of convergence of the adaptive filter 332f according to the phase difference Δφ. Specifically, when the frequency f at the position pos to be damped varies, the phase difference Δφ often varies too. Thus, the convergence coefficient 332u is determined such that the speed of convergence of the adaptive filter 32f changes in proportion to an amount of variation in the phase difference Δφ when the phase difference Δφ varies. Of course, for example, multiplication by a fixed gain may be performed, or a switchable configuration may be provided so as to use one of a plurality of convergence coefficients 32u set in advance according to whether the amount of variation in the phase difference Δφ exceeds a predetermined threshold value, as long as the speed of convergence of the adaptive filter 32f is in accordance with the amount of variation in the phase difference Δφ.

As described above, the vibration damping device according to the present embodiment is characterized in that the phase difference obtaining section 334d forming the deviation information obtaining means 334 obtains the phase difference Δφ (φ−φ') between the phase φ of the vibration (Vi3+Vi4) remaining as a cancellation error and the phase φ' of the canceling vibration Vi4 generated at the position pos to be damped on the basis of the pseudo vibration Vi3' as deviation information corresponding to the deviation, and in that the convergence coefficient changing means 335 changes the convergence coefficient 332u so as to increase the speed of convergence of the adaptive filter 332f as the phase difference Δφ obtained by the phase difference obtaining section 334d forming the deviation information obtaining means 334 is increased and so as to decrease the speed of convergence of the adaptive filter 332f as the phase difference Δφ is decreased.

In the present embodiment, directing attention to a fact that the frequency of the vibration at the position pos to be damped often varies and the deviation between the vibration Vi3 transmitted from the vibration generating source gn to the position pos to be damped and the canceling vibration Vi4 generated at the position pos to be damped on the basis of the pseudo vibration Vi3' increases when the phase difference Δφ (φ−φ') between the phase φ of the vibration (Vi3+Vi4) remaining as the cancellation error and the phase φ' of the canceling vibration Vi4 generated at the position pos to be damped on the basis of the pseudo vibration Vi3' tends to become large, the above phase difference Δφ is obtained as deviation information corresponding to the deviation, and the convergence coefficient 332u is changed so as to increase the speed of convergence of the adaptive filter 332f as the obtained phase difference Δφ is increased and so as to decrease the speed of convergence of the adaptive filter 332f as the phase difference Δφ is decreased. Thus, a configuration for improving the response and stability of vibration damping control can be realized by using the phase difference Δφ as an index of the above deviation.

While embodiments of the present disclosure been described above with reference to the drawings, concrete configurations are not to be considered to be limited to the embodiments. The scope of the present disclosure is illustrated by not only the description of the above-described embodiments but also claims, and further includes all changes within a spirit and a scope equivalent to those of the claims.

For example, in the foregoing embodiments, the convergence coefficient changing means 335 has both of a configuration for changing the convergence coefficient 332u so as to increase the speed of convergence of the adaptive filter 332f and a configuration for changing the convergence coefficient 332u so as to decrease the speed of convergence of the adaptive filter 332f. However, the convergence coefficient changing means 335 may have only a configuration for changing the convergence coefficient 332u so as to increase the speed of convergence of the adaptive filter 332f or only a configuration for changing the convergence coefficient 332u so as to decrease the speed of convergence of the adaptive filter 332f.

In addition, the deviation information obtaining means 334 obtains one of the pieces of deviation information representing the applied vibration force amplitude component, the above amplitude component of the vibration remaining as the cancellation error, the amount of variation in frequency of the vibration to be damped, and the phase difference between the phase of the vibration remaining as the cancellation error and the phase of the vibration generated at the position to be damped on the basis of the pseudo vibration as deviation information corresponding to the above deviation. However, the deviation information obtaining means 334 may be configured to obtain a plurality of pieces of deviation information and change the convergence coefficient. A configuration that obtains a single piece of deviation information may obtain the deviation information in which signs of increase or decrease in the above deviation do not readily appear. In this case, the changing of the convergence coefficient may be delayed. However, when a plurality of pieces of deviation information are obtained, deviation information in which signs of increase or decrease in the above deviation readily appear is obtained more often than in a configuration that obtains a single piece of deviation information. Therefore control accuracy such as response, safety, and the like can be improved.

In addition, the concrete configurations of the parts are not limited to only the above-described embodiments, but are susceptible of various modifications without departing from the spirit of the present disclosure.

Industrial Applicability

According to the first disclosure, even when the frequency of the vibration to be damped is erroneously recognized as a frequency different from an actual frequency, the frequency of the pseudo vibration is adjusted to the frequency of the vibration to be damped, so that the adaptability of the adaptive control algorithm can be improved, and a vibration damping characteristic and stability can be improved.

According to the second disclosure, it is possible to prevent an adverse effect of the vibration by the vibration applying means from being produced on the vibration of other parts and prevent the canceling vibration larger than necessary from being applied when the present frequency comes out of the low sensitivity region, solve problems caused by the low sensitivity region, and improve vibration damping stability.

According to the third disclosure, it is possible to improve the response or stability of vibration damping control without depending on whether the generated canceling vibration needs to be changed greatly according to significant changes in the vibration to be damped.

Thus, according to the first, second, and third disclosures, it is possible to provide a vibration damping device whose vibration damping control is improved in stability.

1 VIBRATION GENERATING SOURCE (ENGINE)
2 CONTROL MEANS
3 VIBRATION DETECTING MEANS (ACCELERATION SENSOR)
4 AUXILIARY MASS
5 VIBRATION APPLYING MEANS (ACTUATOR)
6 VEHICLE BODY FRAME
7 FREQUENCY RECOGNIZING MEANS
8 PHASE DIFFERENCE IDENTIFYING MEANS
9 INSTANT PHASE IDENTIFYING SECTION
10 PSEUDO VIBRATION PHASE IDENTIFYING SECTION
11 PHASE DIFFERENCE IDENTIFYING SECTION
12 RECOGNIZED FREQUENCY CORRECTING MEANS
13 UPPER LIMIT CORRECTION AMOUNT STORING SECTION
14 DEAD ZONE STORING SECTION
15 PSEUDO VIBRATION CALCULATING MEANS
16 PSEUDO VIBRATION CALCULATING SECTION
17 ADAPTIVE FILTER
18 LEARNING ADAPTING SECTION
19 ADAPTIVE CONTROL ALGORITHM
20 CANCELING SIGNAL GENERATING MEANS
21 INVERSE TRANSFER FUNCTION STORING SECTION
22 CANCELING VIBRATION Vi4
23 POSITION POS TO BE VIBRATION-DAMPED
24 PSEUDO VIBRATION Vi3'
25 VIBRATION Vi3+Vi4 REMAINING AS CANCELLATION ERROR
26-1 SIGNAL RELATED TO VIBRATION (IGNITION PULSE SIGNAL)
26-2 ACCELERATION SIGNAL
27 BPF PROCESSING
28 VIBRATION SIGNAL $A \sin(\theta+\phi)$
29 REAL-TIME AMPLITUDE DETECTING SECTION
30 NOTCH PROCESSING
31 FREQUENCY CORRECTION AMOUNT CALCULATING SECTION
32 PHASE DIFFERENCE IDENTIFYING SECTION ($\alpha \cdot \beta$ CALCULATING SECTION)
33 INVERSE TRANSFER FUNCTION PHASE SETTING SECTION
34 OSCILLATOR
35 PULSE SIGNAL
36 FREQUENCY DETECTING SECTION
37 FUNDAMENTAL ELECTRICAL ANGLE CALCULATING SECTION
38 REFERENCE WAVE GENERATING SECTION
39 INVERSE TRANSFER FUNCTION AMPLITUDE SETTING SECTION
40 FREQUENCY CORRECTION CALCULATING PROCESS
41
A1 SINE COMPONENT $\alpha \leq$ THRESHOLD VALUE?
A2 OBTAIN STEP S AS UPPER LIMIT AMOUNT OF CORRECTION
A3 DOES SINE COMPONENT $\alpha$ HAVE POSITIVE SIGN?
A4 $\Delta f$=STEP S
A5 $\Delta f$=-STEP S
42 IGNITION TIMING
43
POSITION POS TO BE VIBRATION-DAMPED
VIBRATION DETECTING MEANS
44 VIBRATION -Vi3 TO BE GENERATED
45 PHASE CORRECTING SECTION
46 SWITCHING SECTION
47 LINEAR ACTUATOR
48 AMPLIFIER
49 VIBRATION DETECTION SIGNAL sg
50 FUNDAMENTAL FREQUENCY f
51 REFERENCE WAVE GENERATING MEANS
52 REFERENCE SINE WAVE
53 REFERENCE COSINE WAVE
54 ADAPTIVE ALGORITHM BLOCK
55 CONVERGENCE PARAMETER $\mu$
56 INTEGRAL EXTRACTING PROCESSING BLOCK
57 EXTRACTING COEFFICIENT
58 INVERSE TRANSFER GAIN STORING MEANS
59 CURRENT EXCESS DETECTING MEANS
60 CURRENT UPPER LIMIT EXCEEDING SIGNAL
61 CURRENT CLAMP TABLE
62 SELECTING SECTION
63 COMPARING SECTION
64 FUNDAMENTAL DEGREE PEAK CURRENT VALUE
65 AMPLITUDE DETECTING MEANS
66 VIBRATION DAMPING CURRENT COMMAND
67 LOW SENSITIVITY DETECTION SIGNAL
68 SENSITIVITY DETERMINING MEANS
69 DEGREE OF TRANSFER (HIGH)
70 DEGREE OF TRANSFER (LOW)
71 TRANSFER FUNCTION GAIN
72 FREQUENCY
73 LOW SENSITIVITY REGION
74 FIRST THRESHOLD VALUE
75 NON-CHANGING REGION
76 NON-LOW SENSITIVITY REGION
77 CURRENT COMMAND
78 CURRENT PI OPERATION BLOCK
79 REMAINING VIBRATION AMPLITUDE COMPONENT OBTAINING SECTION
80 FREQUENCY VARIATION AMOUNT OBTAINING SECTION
81 APPLIED VIBRATION FORCE AMPLITUDE COMPONENT OBTAINING SECTION
82 PHASE DIFFERENCE OBTAINING SECTION
83 DEVIATION INFORMATION OBTAINING MEANS
84 CONVERGENCE COEFFICIENT CHANGING MEANS
85 CANCELING VIBRATION GENERATING COMMAND MEANS 86 SPEED OF CONVERGENCE OF ADAPTIVE FILTER (CONVERGENCE COEFFICIENT)
87 UPPER LIMIT VALUE Dmax
88 FIXED VALUE Ds
89 SPEED CORRESPONDING TO CONVERGENCE COEFFICIENT CHANGED BY CONVERGENCE COEFFICIENT CHANGING MEANS
90 THRESHOLD VALUE Ath
91 AMPLITUDE VALUE A' OF CANCELING VIBRATION (APPLIED VIBRATION FORCE AMPLITUDE COMPONENT)
92 CONVERGENCE COEFFICIENT CHANGING MEANS

What is claimed is:

1. A vibration damping device for canceling out a vibration to be cancelled at a position to be damped, to which a source vibration is transmitted from a vibration generating source, the vibration to be cancelled being cancelled with a canceling vibration, the vibration damping device comprising:
    a calculator including an adaptive control algorithm, which has first multipliers and an adder, the first multipliers multiplying a reference wave by an adaptive filter to calculate a pseudo vibration simulating the vibration to be cancelled at the position;
    a vibration applying actuator that generates a vibration based on the pseudo vibration, which is transmitted to the position to generate the cancelling vibration at the position;
    a vibration detector that detects a remaining vibration remaining as a cancellation error at the position, wherein the adaptive control algorithm is adapted by learning to reduce the remaining vibration;
    a frequency recognizer that recognizes a frequency of the vibration to be cancelled at the position based on a signal related to the source vibration generated by the vibration generating source;
    a reference wave generator that generates the reference wave of a frequency equal to the frequency recognized by the frequency recognizer, wherein the reference wave comprises a reference sine wave and a reference cosine wave;
    a phase difference identifier that detects the remaining vibration, extracts a vibration having a frequency component near the frequency recognized by the frequency recognizer from the remaining vibration with a band-pass filter, identifies a phase of the vibration extracted from the remaining vibration, and identifies a phase difference between the phase of the extracted vibration and a phase of the pseudo vibration;
    a frequency corrector that corrects, based on the phase difference, the frequency of the vibration recognized by the frequency recognizer in a direction of eliminating the phase difference, which corrects a frequency of the reference wave generated by the reference wave generator;
    an inverse transfer function phase setting section which stores the phase component of an inverse transfer function corresponding to the frequency in advance;
    an inverse transfer function amplitude setting section which stores the amplitude component of the inverse transfer function corresponding to the frequency in advance; and
    second multipliers that respectively multiply the reference sine and cosine waves incorporating the phase component of the inverse transfer function by the amplitude component of the inverse transfer function, thereby generating reference sine and cosine waves incorporating the inverse transfer function of the phase and the amplitude, wherein the reference sine and cosine waves generated by the second multipliers are multiplied by the adaptive filter by the first multipliers, and the result of the multiplication are added together by the adder, thereby generating the pseudo vibration.

2. The vibration damping device according to claim 1, wherein
    when the phase difference identifier identifies the phase difference, the frequency corrector corrects the frequency of the vibration recognized by the frequency recognizer by a correction amount not exceeding an upper limit correction amount.

3. The vibration damping device according to claim 1, wherein
    the frequency corrector corrects the frequency of the vibration recognized by the frequency recognizer with an amount of correction corresponding to an amount of shift of the phase difference identified by the phase difference identifier.

4. The vibration damping device according to claim 3, wherein
    the frequency corrector corrects the frequency of the vibration recognized by the frequency recognizer when an amount of shift of the phase difference identified by the phase difference identifier is larger than a threshold value, and does not correct the frequency of the vibration recognized by the frequency recognizer when the amount of shift of the phase difference is equal to or smaller than the threshold value.

5. The vibration damping device according to claim 1, wherein
    the frequency corrector corrects the frequency of the vibration recognized by the frequency recognizer when an amount of shift of the phase difference identified by the phase difference identifier is larger than a threshold value, and does not correct the frequency of the vibration recognized by the frequency recognizer when the amount of shift of the phase difference is equal to or smaller than the threshold value.

6. A vibration damping method for a vibration damping device for canceling out a vibration to be cancelled, at a position to be damped, to which a source vibration is transmitted from a vibration generating source, the vibration to be cancelled being cancelled with a cancelling vibration, the vibration damping method comprising:
    calculating a pseudo vibration simulating the vibration to be canceled at the position based on a reference wave, by using an adaptive control algorithm;
    generating a vibration based on the pseudo vibration, which is transmitted to the position to generate the canceling vibration at the position;
    detecting a remaining vibration remaining as a cancellation error at the position, wherein the adaptive control algorithm is adapted by learning to reduce the remaining vibration;
    recognizing a frequency of the vibration to be canceled at the position based on a signal related to the source vibration generated by the vibration generating source;
    generating the reference wave of a frequency equal to the recognized frequency, wherein the reference wave comprises a reference sine wave and a reference cosine wave;
    detecting the remaining vibration and extracting a vibration having a frequency component near the frequency recognized by the frequency recognizer from the remaining vibration with a band-pass filter;

identifying a phase of the vibration extracted from the remaining vibration and identifying a phase difference between the phase of the extracted vibration and a phase of the pseudo vibration;

correcting, based on the phase difference, the frequency of the vibration recognized in the recognizing in a direction of eliminating the phase difference, which corrects a frequency of the reference wave generated by the reference wave generator;

storing the phase component of an inverse transfer function corresponding to the frequency in advance; and storing the amplitude component of the inverse transfer function corresponding to the frequency in advance;

wherein the calculating step includes:

respectively multiplying reference sine and cosine waves incorporating the phase component of the inverse transfer function by the amplitude component of the inverse transfer function, to generate reference sine and cosine waves incorporating the inverse transfer function of the amplitude and the phase;

respectively multiplying the reference sine and cosine waves incorporating the inverse transfer function of the amplitude and the phase, by an adaptive filter; and adding together the respectively multiplied reference sine and cosine waves incorporating the inverse transfer function of the amplitude and the phase.

\* \* \* \* \*